(12) United States Patent
Bradley et al.

(10) Patent No.: US 6,905,467 B2
(45) Date of Patent: *Jun. 14, 2005

(54) ULTRASONIC HARMONIC IMAGING SYSTEM AND METHOD USING WAVEFORM PRE-DISTORTION

(75) Inventors: Charles E. Bradley, Burlingame, CA (US); Gregory L. Holley, Mountain View, CA (US); Lawrence J. Newell, Saratoga, CA (US); David J. Hedberg, Menlo Park, CA (US); Dave Napolitano, Menlo Park, CA (US)

(73) Assignee: Acuson Corporation, Mountain View, CA (US)

(*) Notice: Subject to any disclaimer, the term of this patent is extended or adjusted under 35 U.S.C. 154(b) by 409 days.

This patent is subject to a terminal disclaimer.

(21) Appl. No.: 09/884,407

(22) Filed: Jun. 18, 2001

(65) Prior Publication Data

US 2001/0051771 A1 Dec. 13, 2001

Related U.S. Application Data

(60) Division of application No. 09/061,014, filed on Apr. 15, 1998, now Pat. No. 6,312,379, which is a continuation-in-part of application No. 08/911,973, filed on Aug. 15, 1997, now abandoned.

(51) Int. Cl.[7] .................................................. A61B 8/00
(52) U.S. Cl. ...................................................... 600/443
(58) Field of Search ........................ 600/437, 440–441, 600/443, 447, 458–459, 438; 367/11, 103, 138

(56) References Cited

U.S. PATENT DOCUMENTS 4,712,037 A   12/1987   Verbeek et al.
4,771,792 A    9/1988   Seale
5,040,537 A    8/1991   Katakura
5,111,823 A    5/1992   Cohen
5,115,809 A    5/1992   Saitoh et al.

(Continued)

FOREIGN PATENT DOCUMENTS

| EP | 0 357 164 | 3/1990 |
| EP | 0 770 352 A1 | 5/1997 |
| WO | WO 98/20361 | 5/1998 |

OTHER PUBLICATIONS

"Determination of Third–Order Elastic Constants from Ultrasonic Harmonic Generation Measurements", M.A. Braezeale and Jacob Philip, *Physical Acoustics,*, vol. XVII, 1984.

(Continued)

*Primary Examiner*—Francis J. Jaworski

(57) ABSTRACT

Improvements to a method for imaging a target, which method including the steps of (a) transmitting ultrasonic energy at a fundamental frequency, (b) receiving reflected ultrasonic energy at a harmonic of the fundamental frequency and (c) generating an image responsive to reflected energy at the harmonic, are provided. The transmitting step includes transmitting a waveform with a positive pulse spatially defined by first and second zero values. A positive peak amplitude of the positive pulse is a first distance from the first zero value that is less than half a second distance between said first and second zero values. Thus, the waveform includes a fundamental spectral component and a harmonic spectral component at the transducer. An attenuation normalized peak of the harmonic spectral component is reduced at a region spaced from the transducer as compared to the peak at a region adjacent to the transducer. A negative peak is also shifted or pre-distorted. Various pre-distortions of the waveform may compensate for propagation, scattering, or system non-linearities.

48 Claims, 26 Drawing Sheets

U.S. PATENT DOCUMENTS

| | | |
|---|---|---|
| 5,190,766 A | 3/1993 | Ishihara |
| 5,195,520 A | 3/1993 | Schlief et al. |
| 5,215,680 A | 6/1993 | D'Arrigo |
| 5,219,401 A | 6/1993 | Cathignol et al. |
| 5,255,683 A | 10/1993 | Monaghan |
| 5,285,788 A | 2/1994 | Arenson et al. |
| 5,325,858 A | 7/1994 | Morilzumi |
| 5,358,466 A | 10/1994 | Aida et al. |
| 5,380,411 A | 1/1995 | Schlief |
| 5,410,205 A | 4/1995 | Gururaja |
| 5,410,516 A | 4/1995 | Uhlendorf et al. |
| 5,417,214 A | 5/1995 | Roberts et al. |
| 5,425,366 A | 6/1995 | Reinhardt et al. |
| 5,433,207 A | 7/1995 | Pretlow, III |
| 5,438,554 A | 8/1995 | Seyed-Bolorforosh et al. |
| 5,456,255 A | 10/1995 | Abe et al. |
| 5,456,257 A | 10/1995 | Johnson et al. |
| 5,469,849 A | 11/1995 | Sasaki et al. |
| 5,479,926 A | 1/1996 | Ustuner et al. |
| 5,482,046 A | 1/1996 | Deitrich |
| 5,523,058 A | 6/1996 | Umemura et al. |
| 5,526,816 A | 6/1996 | Arditi |
| 5,558,092 A | 9/1996 | Unger et al. |
| 5,560,364 A | 10/1996 | Porter |
| 5,577,505 A | 11/1996 | Brock-Fisher et al. |
| 5,579,768 A | 12/1996 | Klesenski |
| 5,579,770 A | 12/1996 | Finger |
| 5,580,575 A | 12/1996 | Unger et al. |
| 5,601,086 A | 2/1997 | Pretlow, III et al. |
| 5,608,690 A | 3/1997 | Hossack et al. |
| 5,617,862 A | 4/1997 | Cole et al. |
| 5,632,277 A | 5/1997 | Chapman et al. |
| 5,675,554 A | 10/1997 | Cole et al. |
| 5,678,554 A | 10/1997 | Hossack et al. |
| 5,696,737 A | 12/1997 | Hossack et al. |
| 5,706,819 A | 1/1998 | Hwang |
| 5,724,976 A | 3/1998 | Mine et al. |
| 5,740,128 A | 4/1998 | Hossack et al. |
| 5,833,614 A | 11/1998 | Dodd et al. |
| 5,913,823 A | 6/1999 | Hedberg et al. |
| 5,957,851 A | 9/1999 | Hossack |
| 5,995,450 A | 11/1999 | Cole et al. |
| 6,005,827 A | 12/1999 | Hossack et al. |
| 6,016,285 A | 1/2000 | Wrighte et al. |
| 6,023,977 A | 2/2000 | Langdon et al. |
| 6,056,943 A | 5/2000 | Schutt |
| 6,110,120 A | 8/2000 | Holley et al. |
| 6,193,659 B1 | 2/2001 | Ramamurthy et al. |
| 6,312,379 B1 * | 11/2001 | Bradley et al. ............. 600/437 |

OTHER PUBLICATIONS

Pi Hsien Chang, et al., "Second Harmonic Imaging and Harmonic Doppler Measurements with Albunex." IEEE Transactions on Ultrasonics, Ferroelectrics, and Frequency Control, vol. 42, No. 6, Nov. 1995.

Marc Gensane, "Bubble population measurements with a parametric array." J. Acoustical Society of America, 95 (6), Jun. 1994.

Ken Ishihara, et al., "New Approach to Noninvasive Manometry Based on Pressure Dependent Resonant Shift of Elastic Microcapsules in Ultrasonic Frequency Characteristics." Japanese J. of Applied Physics, vol. 2 (1988).

V.L. Newhouse, et al., "Bubble size measurements using the nonlinear mixing of two frequencies," J. Acoustical Society of America, 75 (5), May 1984.

"Small Spheres Lead to Big Ideas." Research News, Science vol. 267, Jan. 20, 1995.

Abstracts Journal of the American Society of Echocardiography, vol. 8, No. 3 pp. 345–346, 355, 358–364.

Deborah J. Rubens, MD, et al., "Sonoelasticity Imaging of Prostate Cancer: In Vitro Results." Radiology, vol. 195, No. 2, 1995.

B. Schrope, et al., "Simulated Capillary Blood Flow Measurement Using a Nonlinear Ultrasonic Contrast Agent." Ultrasonic Imaging 14 (1992).

Fred Lee, Jr., MD, et al., "Sonoelasticity Imaging: Results in in Vitro Tissue Specimens." Radiology, vol. 181, No. 1 (1991).

Kevin J. Parker, PhD., et al., "Sonoelasticity of Organs: Shear Waves Ring A Bell." J. Ultrasound Med., 11 (1992).

William Armstrong, M.D., et al., "Position Paper on Contrast Echocardiography." American Society of Echocardiography, draft 1, Jun. 6, 1994.

K.J. Parker, et al., "Tissue Response to Mechanical Vibrations for 'Sonoelasticity Imaging'." Ultrasound in Med. and Biol., vol. 16, No. 3, (1990).

Robert M. Lerner, et al., "'Sonoelasticity' Images Derived from Ultrasound Signals in Mechanically Vibrated Tissues." Ultrasound in Med. and Biol., vol. 16, No. 3 (1990).

Excerpt from Ultrasonics: Fundamentals and Applications (1992), pp. 380–393, 363–365.

J.A. Hossack, et al., "Improving Transducer Performance Using Multiple Active Layers." SPIE vol. 1733 (1992).

Volkmar Uhlendorf, et al., "Nonlinear Acoustical Response of Coated Microbubbles in Diagnostic Ultrasound." IEEE 1994 Ultrasonics Symposium.

John A. Hossack, et al., "Improving the Characteristics of a Transducer Using Multiple Piezoelectric Layers." IEEE Transactions on Ultrasonics, Ferroelectrics, and Frequency Control, vol. 40, No. 2, Mar. 1993.

H. Edward Karrer, et al., "A Phased Array Acoustic Imaging System for Medical Use." IEEE 1980 Ultrasonics Symposium.

"HP Ultrasound Technologies—Viability." About HP Ultrasound Imaging, WWW document, 1997.

Ted Christopher, "Finite Amplitude Distortion–Based Inhomogeneous Pulse Echo Ultrasonic Imaging." IEEE Transactions on Ultrasonics, Ferroelectrics, and Frequency Control, vol. 44, No. 1, Jan. 1997.

"Supplement to Journal of the American College of Cardiology." American College of Cardiology, $45^{th}$ Annual Scientific Session, Mar. 24–27, 1996 pp. 21A, 63A, 239–240A.

Yang–Sub Lee, et al., "Time–Domain Modeling of Pulsed Finite–Amplitude Sound Beams." J. Acoustical Society of America, 97 (2), Feb. 1995.

Michalakis A. Averkiou, et al., "Self–Demodulation of Amplitude and Frequency–Modulated Pulses in a Thermoviscous Fluid." J. Acoustical Society of America, 94 (5), Nov. 1993.

* cited by examiner

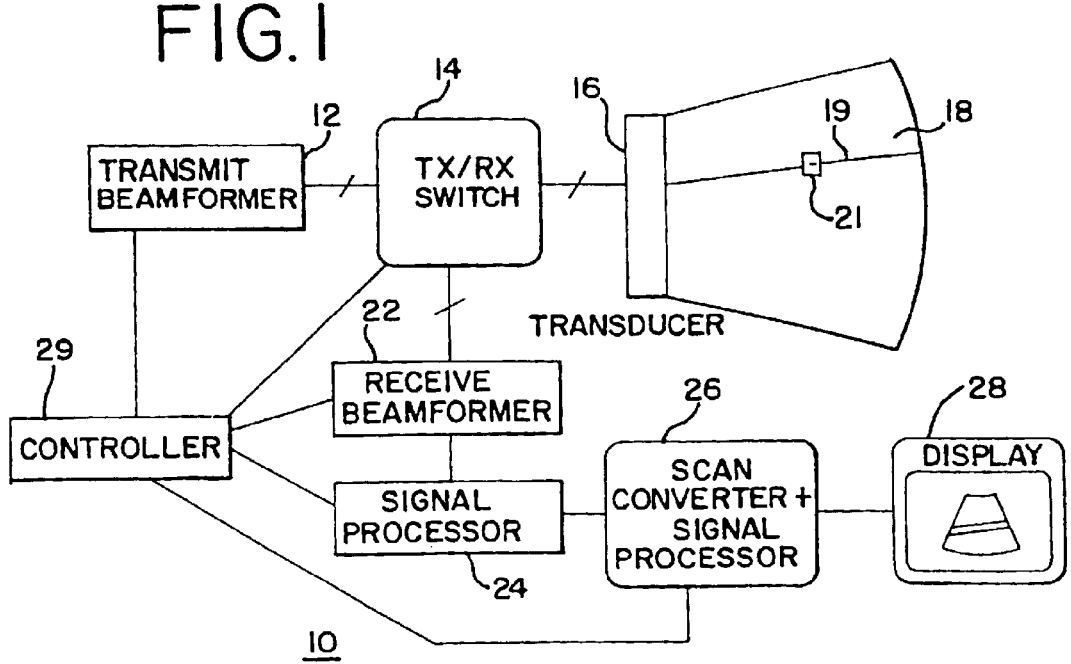
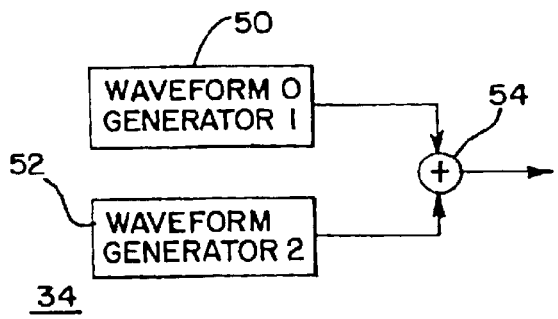

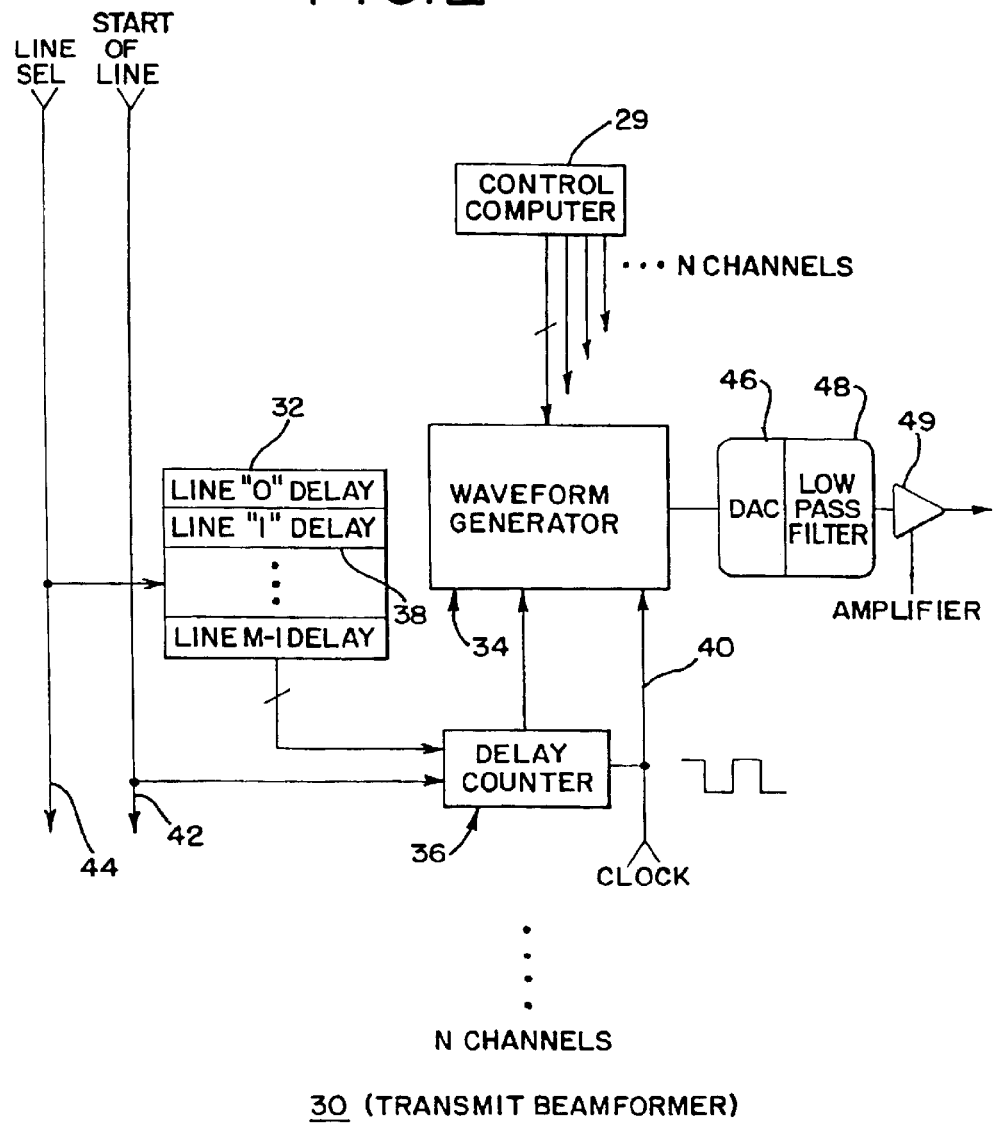

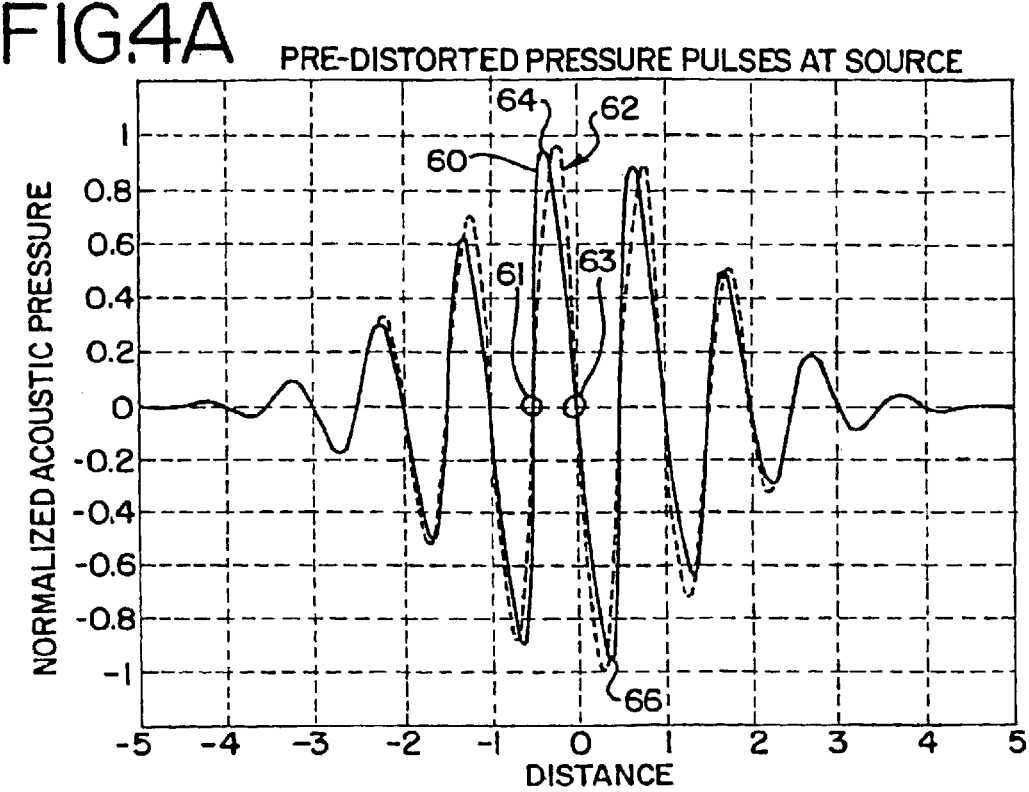
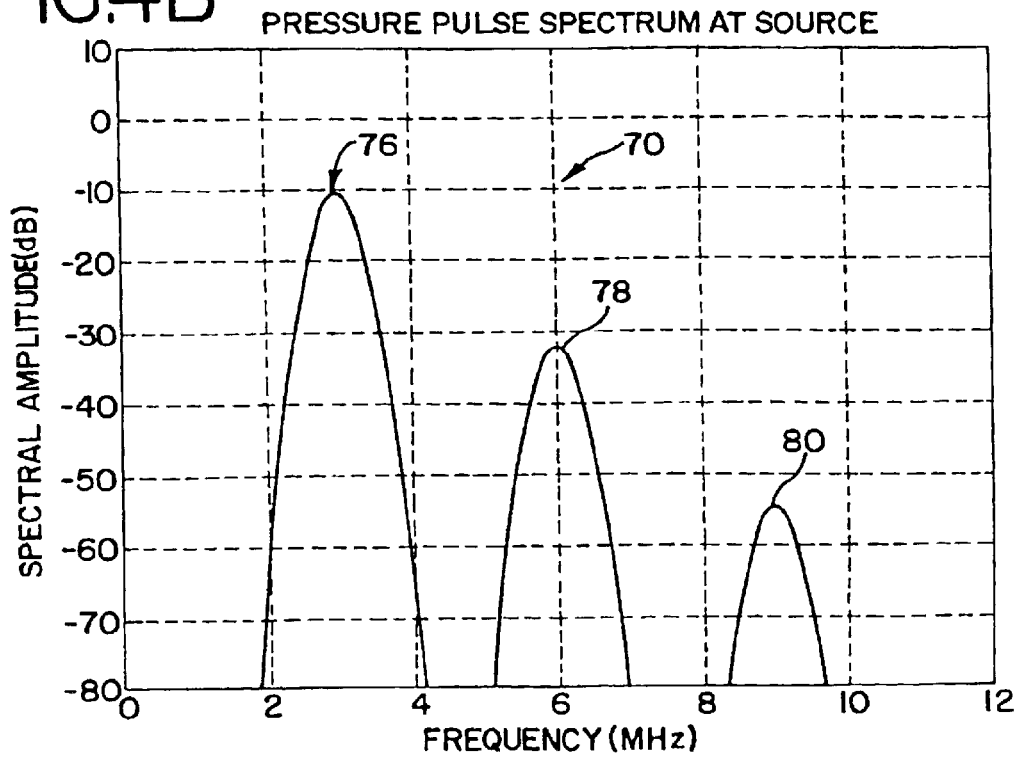

APPROXIMATE PREDISTORTED PULSE (FUNDAMENTAL COMPONENT)

APPROXIMATE PREDISTORTED SPECTRUM (FUNDAMENTAL COMPONENT)

APPROXIMATE PREDISTORTED PULSE (HARMONIC COMPONENT)

APPROXIMATE PREDISTORTED SPECTRUM (HARMONIC COMPONENT)

SOURCE WAVEFORM: FUNDAMENTAL(−) AND 2nd HARMONIC(--) COMPONENTS

SOURCE SPECTRUM: FUNDAMENTAL(−) AND 2nd HARMONIC(--) COMPONENTS

SOURCE WAVEFORM: FUNDAMENTAL(—) AND 2nd HARMONIC(--) COMPONENTS

SOURCE SPECTRUM: FUNDAMENTAL(—) AND 2nd HARMONIC(--) COMPONENTS

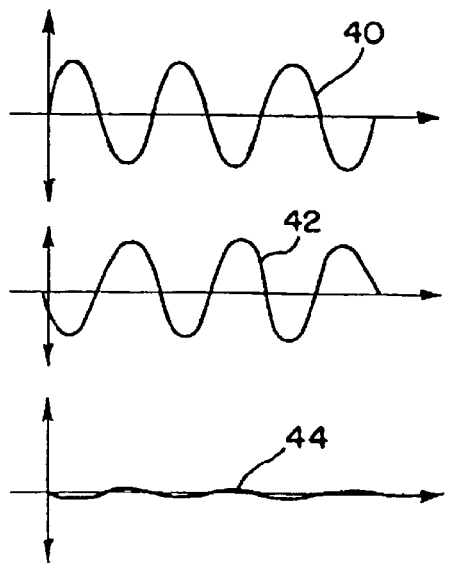
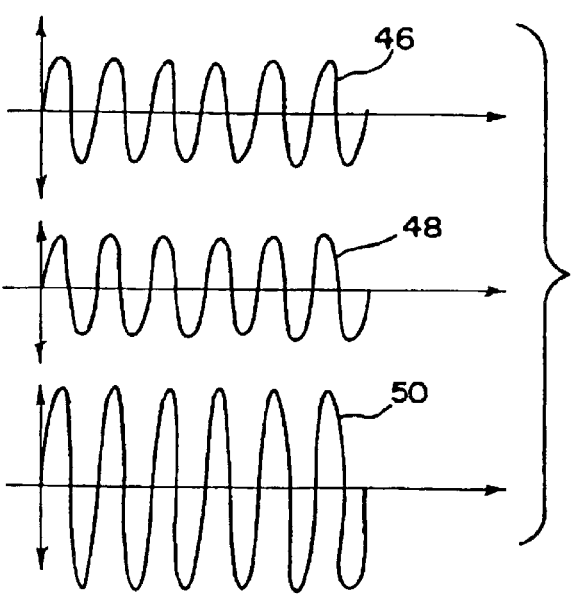
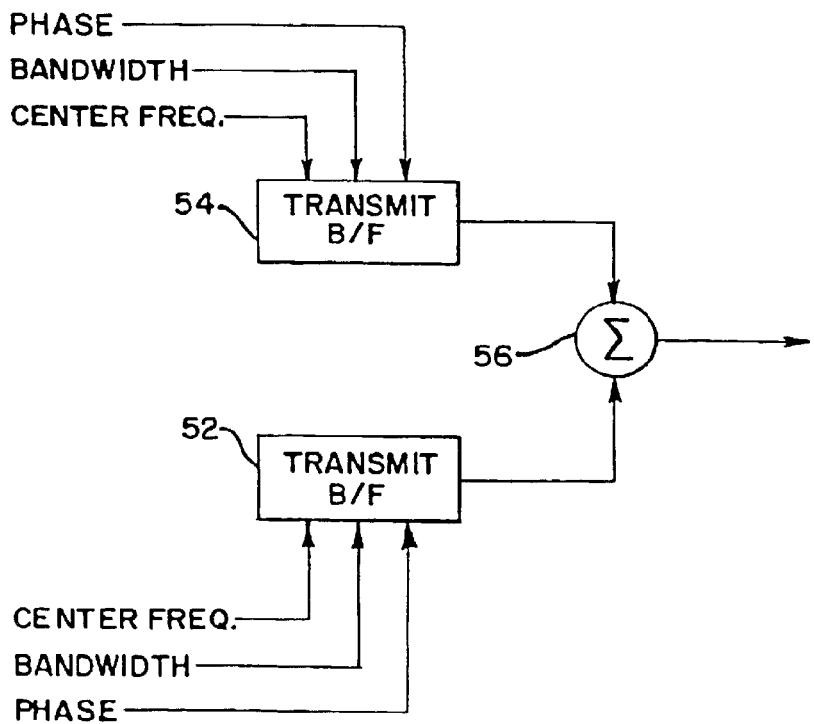

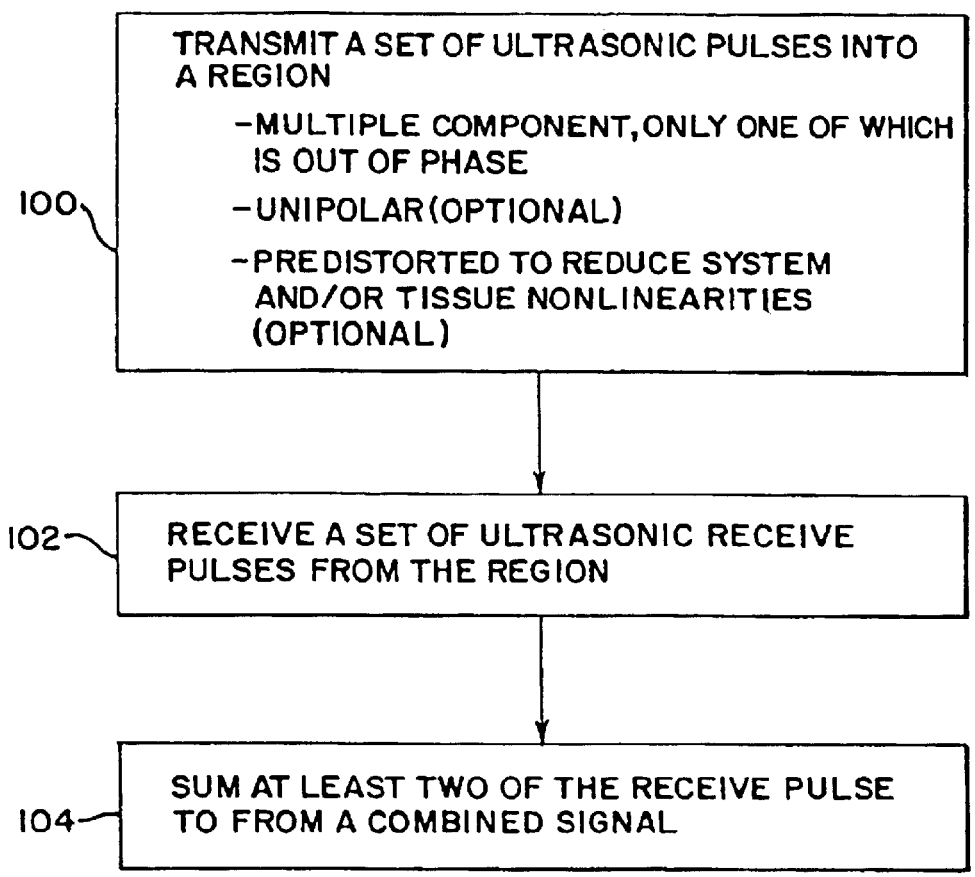

ULTRASONIC HARMONIC IMAGING SYSTEM AND METHOD USING WAVEFORM PRE-DISTORTION

CROSS REFERENCE TO A RELATED APPLICATION

This application is a division of application Ser. No. 09/061,014 (filed) Apr. 15, 1998, now U.S. Pat No. 6,312,379, which is a continuation-in-part of Ser. No. 08/911,973, filed Aug. 15, 1997 (now abandoned), which are hereby incorporated by reference herein."

FIELD OF THE INVENTION

This invention generally relates to ultrasound imaging systems. In particular, the invention relates to an ultrasound system and method for generating waveforms for harmonic imaging.

BACKGROUND OF THE INVENTION

Ultrasound imaging systems generate images of a body. One type of imaging is harmonic imaging. Ultrasound signals or pulses are transmitted at fundamental frequencies, and echo signals are received by a transducer. The echo signals are filtered to obtain signals associated with harmonic frequencies.

The signals associated with harmonic frequencies are generated through non-linear propagation and scattering within the body. For example, the signals are generated by non-linear scattering from contrast agents. Non-linear contrast agents are described for example by V. Uhlendorf, et al., in "Nonlinear Acoustical Response of Coated Microbubbles in Diagnostic Ultrasound" (1995 Ultrasonic Symposium, pp. 1559–1562). Such agents possess a fundamental resonant frequency. When they are insonified with high intensity ultrasonic energy at this fundamental frequency, they radiate ultrasonic energy at a harmonic of the fundamental frequency as well as at the fundamental frequency. Such contrast agents are often used to highlight regions containing blood loaded with the contrast agent. For example, in the case of a blood-filled chamber of the heart, the borders of the chamber can be distinguished more easily when contrast agents are used. Since the contrast agent generates harmonic ultrasound energy, echoes at the fundamental frequency from tissue or fluid containing no contrast agent may be eliminated by filtering at a receive beamformer.

Other than contrast agents, another source of harmonic energy is nonlinear propagation. As the ultrasonic burst propagates through the body, the burst distorts. The distortion corresponds to the shifting of energy to harmonic frequencies. As the burst propagates, more harmonic signals are generated. The harmonic signals are scattered from tissue and other structures in the body. Some of the harmonic signals impinge upon the transducer.

Another source of harmonic energy is system hardware nonlinearity. For example, high-voltage transmit circuitry may introduce harmonic energy in the transmit pulse before application to the transducer for transmission. Nonlinearity of the transducer may also add to harmonic content in the transmitted signal.

For contrast agent imaging, the signals output by the receive beamformer preferably include substantially only information from contrast agents (nonlinear scattering) and structure within the body (nonlinear propagation). The present invention is directed to improvements to reduce the harmonic information associated with structures in the body and system nonlinearity for harmonic imaging, whether imaging tissue or contrast agents.

SUMMARY OF THE INVENTION

This invention relates to improvements to a method for harmonic imaging of a target, which method comprises the steps of (a) transmitting ultrasonic energy at a fundamental frequency, (b) receiving reflected ultrasonic energy at a harmonic of the fundamental frequency and (c) generating an image responsive to the reflected energy at the harmonic.

According to a first aspect of this invention, the transmitting step includes the step of pre-distorting at least one of a plurality of waveforms as a function of a non-linearity. In various embodiments, the non-linearity may comprise a device non-linearity, a waveform propagation non-linearity, and combinations thereof.

According to a second aspect of this invention, the transmitting step includes the step of transmitting a waveform comprising a fundamental spectral component and a harmonic spectral component from a transducer. An attenuation normalized peak of the harmonic spectral component is reduced at a region spaced from the transducer as compared to the peak at a region adjacent to the transducer.

According to a third aspect of this invention, the transmitting step includes the step of transmitting a pre-distorted waveform from a transducer. The pre-distorted waveform includes a harmonic spectral peak suppressed by about 4 dB or more at a region of interest spaced from the transducer as compared to a harmonic spectral peak at the region associated with transmission of a waveform comprising a fundamental spectral component adjacent said transducer.

According to a fourth aspect of this invention, the transmitting step includes the step of transmitting a waveform comprising a positive pulse spatially defined by first and second zero values. A positive peak amplitude of the positive pulse is a first distance from the first zero value that is less than half a second distance between said first and second zero values.

BRIEF DESCRIPTION OF THE DRAWINGS

FIG. 1 is a block diagram of an ultrasonic imaging system suitable for use with the method of this invention.

FIG. 2 is a block diagram of a transmit beamformer suitable for use in the system of FIG. 1.

FIG. 3 is a block diagram of waveform generators.

FIGS. 12a and 12b are waveform diagrams illustrating operation of the system of FIG. 10.

FIG. 13 is a block diagram of an alternative transmit beamformer for implementing the present invention.

FIG. 31 is a flow chart of a method implemented with the imaging system of FIG. 10.

DETAILED DESCRIPTION OF THE PRESENTLY PREFERRED EMBODIMENTS

Figure 4C:
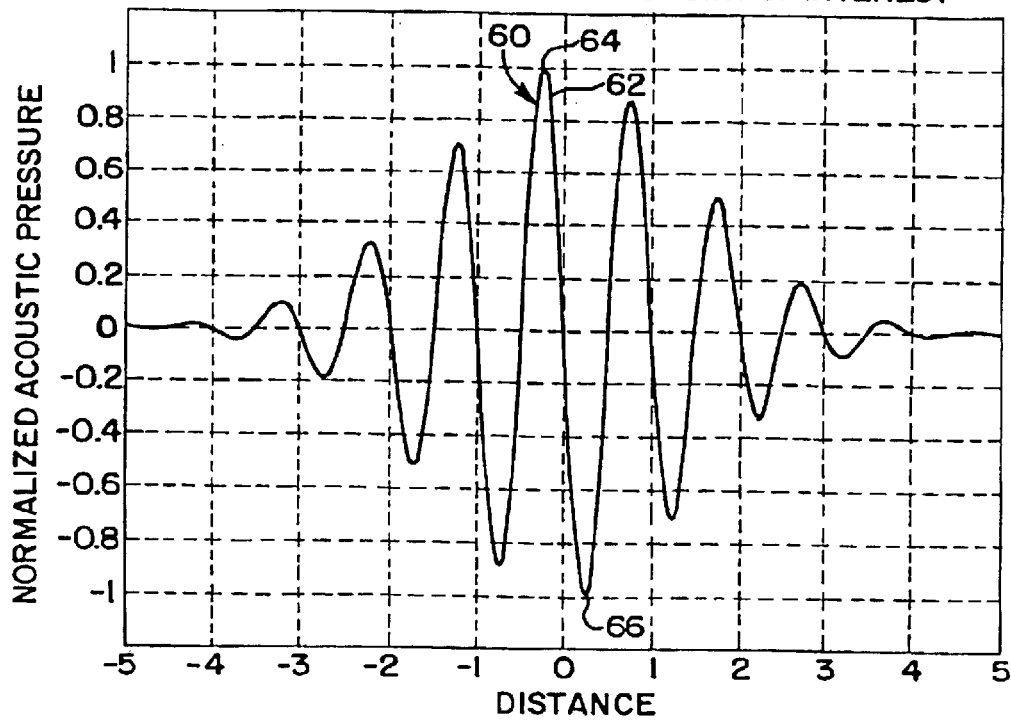
FIGS. 4 A–F are graphical representations of an acoustical waveform at three different depths (A, C, E) and corresponding spectra (B, D, F), respectively.

The preferred embodiments described below are designed to suppress harmonic energy at depths along a transmitted ultrasound beam in comparison to the harmonic energies generated along the beam by transmitting a waveform with little or no harmonic content at the source. By suppressing the harmonic energy, echo signals along the transmitted ultrasound beam, such as at a region of interest, are associated with a better ratio of harmonic energies due to a contrast agent to harmonic energies due to tissue. When contrast agent is not present, a better ratio of harmonic energy due to propagation through tissue to harmonic energy generated by system hardware may be obtained. Suppressing the harmonic energy along the ultrasound beam also allows reduction of harmonic energies scattered at one region relative to another region along the ultrasound beam for tissue harmonic imaging. FIG. 1 shows generally an ultrasound system 10 which can be used to practice the method of this invention, such as pre-distorting acoustic waveforms.

The system 10 includes a controller 29 for coordinating the generation of an image. The system 10 also includes a transmit beamformer 12 that supplies voltage transmit waveforms via a transmit and receive switch or a multiplexer 14 to a transducer array 16. As known in the art, the waveforms are apodized and focused along ultrasonic beams or lines in one of various formats, such as steered linear, sector, or Vector®.

The transducer array 16 is of any suitable type, such as a piezoelectric linear array. Another transducer, such as a two-dimensional or one-and-half dimensional array, may also be used. The transducer 16 is preferably of sufficient bandwidth to transmit both fundamental and harmonic components of an acoustical waveform as discussed below and may include a mechanical focus, such as by use of an acoustic lens.

The transducer array 16 generates an ultrasonic transmit beam 19 in response to the transmit waveforms, and this transmit beam 19 propagates outwardly through a subject 18 being imaged. The ultrasonic transmit beam 19 comprises a plurality of acoustic pressure waveforms, each of the plurality of waveforms is transmitted from an element of the transducer array 16 in response to one of the transmit waveforms. The ultrasonic transmit beam 19 corresponds to one or more electrical focal points. Based on delays, the plurality of waveforms are focused at a region along the ultrasound transmit line 19. The region comprises a point, area or volume. For more than one focal region, a set of waveforms with corresponding delays is transmitted for each focal region sequentially.

The subject 18 being imaged preferably includes a non-linear contrast agent 20, such as that described above. Any suitable contrast agent may be used, as long as it absorbs ultrasonic energy at a first frequency and radiates ultrasonic energy at a second frequency, different from the first frequency. In this example, the first frequency is referred to as the fundamental frequency, and the second frequency is a harmonic of the first frequency. As used herein, "harmonic" includes sub-harmonics and fractional harmonic energy (e.g. one-half or three-halves of the fundamental), as well as higher harmonics (e.g. two or three times the fundamental). Generally, harmonic frequencies are frequencies corresponding to non-linear propagation or scattering. Non-linear response may also be understood as shifting energy associated with a frequency or frequencies to another frequency or frequencies. Instead of contrast agent harmonic imaging as discussed above, the techniques of the present invention may also be used for tissue harmonic imaging. In tissue harmonic imaging, no non-linear contrast agent is added to the subject 18, and only the native non-linear characteristics of the tissue are relied on to create the ultrasonic image.

Ultrasonic energy propagated, scattered or radiated at harmonic frequencies, such as a band of frequencies corresponding to the second order harmonic of the transmitted frequency band, is received by the transducer array 16. Ultrasonic energy corresponding to linear propagation and scattering is also received by the transducer array 16. In response to the ultrasonic energy, the elements of the transducer array 16 generate voltage signals. The voltage signals are provided to a receive beamformer 22. The receive beamformer 22 is of a construction known in the art, such as an analog or digital receive beamformer capable of processing signals associated with harmonic frequencies. The receive beamformer 22 and the transmit beamformer 12 may comprise a single device. As known in the art, each voltage signal is delayed, apodized, and summed with other voltage signals. Each summed signal represents a region 21 in the subject 18. An ongoing stream of signals represents the ultrasound beam or line 19 received from the subject 18. For ultrasound transmit lines 19 associated with a plurality of focal points, the stream of signals corresponds to a plurality of transmit waveform firings.

The receive beamformer 22 also demodulates the summed signals to baseband. The demodulation frequency is selected in response to a harmonic frequency, such as a second order harmonic frequency. The summed signals are demodulated to baseband by shifting the selected harmonic frequency (the demodulation frequency). Signals associated with frequencies other than near baseband are removed by low pass filtering. As an alternative or in addition to demodulation, the receive beamformer 16 provides bandpass filtering. Thus, signals at frequencies other than a range of frequencies centered at or near the desired receive minus any demodulation frequency are filtered from the summed signals. The demodulated or filtered signal is passed to a signal processor 24 as a complex in phase and quadrature (I and Q) signal, but other types of signals such as real value signals may be passed.

The signal processor 24 comprises one or more processors for generating image information, such as spectral Doppler, color Doppler, B-mode or M-mode information. Preferably, the signal processor 24 comprises at least a B/M-mode processor. The signal processor 24 is preferably a digital signal processor and operates as known in the art. Thus, information representing the intensity of the ultrasonic energy associated with the I and Q signals is generated.

The signal processor 24 outputs information to a scan converter and image processor 26. The scan converter and image processor 26 is of a construction known in the art and generates image information, such as B-mode image information. After scan conversion, information associated with an image is converted to a display value or values. The information is converted to the display value with a lookup table, as known in the art. Other display value generation devices may be used. Display values, or image information, is provided to a display 28 as known in the art. Thus, a two- or three-dimensional image, such as a B-mode image, is displayed.

A plurality of ultrasound lines 19 form each displayed image. A plurality of I and Q signals or samples representing different ranges or depths along the ultrasound line, such as the region 21, form each ultrasound line 19.

Turning now to FIG. 2, a block diagram of a first preferred embodiment 30 of the transmit beamformer of FIG. 1 for generating the acoustic waveforms comprising the ultrasound line 19 is shown. The transmit beamformer 30 preferably includes N channels, one for each of the transducers of the transducer array 16 (FIG. 1). Alternatively, one channel may be connected to more than one transducer element, or some transducer elements are not connected to a channel. Each channel includes a delay memory 32, a waveform generator 34 and a delay counter 36. The delay memory 32 includes M words 38, such as 256 words, one for each possible steering angle or ultrasound transmit line. For ultrasound transmit lines associated with a plurality of focus regions, each delay word 38 corresponds to a focal region and an ultrasound transmit line. Each delay word 38 of the delay memory 32 is set equal to a negative number equal to the number of clock cycles of the clock signal line 40 that elapse between a start of line signal on line 52 and the first non zero value of the associated waveform. For simplicity, it is assumed that zero is defined as a delay word 38 having the most significant bit equal to 1 and all other bits equal to 0. Hence, the most significant bit becomes an enable signal for the waveform generator 34.

The delay memory 32 is not required. The focusing delay may be calculated in real time. Alternate embodiments of the transmit beamformer are possible, such as varying the waveform on a channel to channel basis with the waveform for each channel incorporating the delay.

The waveform generator 34 is of any construction known in the art such as the generator disclosed in Method and Apparatus For A Transmit Beamformer System, U.S. Pat. No. 5,675,554 (Ser. No. 08/673,410, filed Jul. 15, 1996), the disclosure of which is herein incorporated by reference. Preferably, the waveform generator 34 includes a waveform memory. Alternative means for waveform generation, including RAM or ROM memory, logic based or analog devices, are also possible. The waveform generator 34 in this embodiment stores a single envelope corresponding to the waveform in digital form, which is used for all transmit scan lines. For example, 64 or 128 successive 8-bit words representing the envelope are stored. The magnitude of each 8-bit word corresponds to the voltage amplitude at respective positions in the desired output waveform. When the waveform memory of the waveform generator 34 is read with a 40 megahertz clock on the line 40, the resulting sequence of digital values defines an envelope approximately 0.1 to 10 microseconds in duration. The envelope corresponds to a sampling rate of 8 or more samples for every cycle of a carrier signal. Preferably, the sampling rate is 16 or more samples per carrier cycle. The envelope is modulated with the carrier signal to create the waveform, as discussed below. The waveform has an associated center frequency. As used herein, the center frequency represents the frequency in a band of frequencies approximately corresponding to the center of the amplitude distribution. Alternatively, the envelope is stored as amplitude and phase (or equivalently as a complex number) representing both the amplitude and phase of the waveform.

The waveform output from the waveform generator 34 is preferably a summation of two or more waveforms. Referring to FIG. 3, for each channel, the waveform generator 34 (FIG. 2) preferably comprises two waveform generators 50 and 52 and a summer 54. As discussed below, one of the waveform generators 50 or 52 generates a waveform associated with the desired fundamental spectral response and the other waveform generator 50 or 52 generates a waveform associated with the desired harmonic frequency spectral response. The waveforms are summed by the summer 54.

In an alternative construction, the waveform generator 34 comprises one waveform generator capable of outputting a waveform corresponding to the acoustic waveform discussed below. For example, if the waveform generator 34 stores complex values (amplitude and phase), a single envelope is used to define a burst comprising both fundamental and harmonic frequency components. One possible embodiment for this alternative construction is described in U.S. application Ser. No. 08/893,150, filed Jul. 15, 1997, the disclosure of which is herein incorporated by reference.

In use, each channel responds to an ultrasound transmit line and/or portion of a ultrasound transmit line selection signal on line 44 by loading the delay word 38 for the selected ultrasound transmit line or portion of the ultrasound transmit line into the delay counter 36. The delay counter 36 responds to a start of line or a portion of line signal on line 42 by incrementing the stored value with each cycle of the 40 megahertz or other frequency clock on line 40. When the delay counter 36 increments to 0, it enables the waveform generator 34. Subsequently generated values of the delay counter 36 (incrementing now from zero words) became address values for the waveform generator 34. As each word in the waveform memory of the waveform generator 34 is addressed, the corresponding 8-bit word for each of the waveform generators 50 and 52 (see FIG. 3) is read and modulated with a carrier to create the waveforms. A different carrier frequency and phase may be used for each envelope.

The phase of the carrier signal is set relative to the envelope. For example, the modulation is based on the equation $$e(t-\Delta t)\cos 2\pi f_c(t-\Delta t)$$

where e(t) represents the envelope, Δt represents the amount of delay (delay word 38), and $f_c$ represents the carrier frequency. Other modulating functions may be used. The phase of the carrier is preferably varied relative to the envelope to further focus the ultrasound transmit line, as known in the art. The phase is pre-calculated or is calculated in real time based on the delay word 38, the carrier frequency, and a desired delay value (less coarsely quantized than the delay word 38).

The two waveforms are summed together. Alternatively, the waveform generator 34 produces the waveform without summation. As another alternative, one waveform generator 34 is used for a plurality or all the channels. The transmit beamformer 12 (FIG. 1) generates a copy of the waveform for each channel.

The output of the waveform generator 34 or each waveform generator 50 and 52 (see FIGS. 2 and 3) is scaled based on an apodization scheme and applied to a digital to analog converter 46. The analog output signal of the converter 46 is passed through a low pass filter 48, such as a Bessel filter, to reduce sampling effects and then to an amplifier 49. The output of the amplifier 49 is the transmit waveform discussed above that is applied to the respective transducer of the transducer array 16 via the multiplexer 14 (see FIG. 1).

The transmit beamformer 30 utilizes values for the waveform stored in the waveform generator 34 and the delays stored in the delay memory 32 that enhance insonification for harmonic imaging, such as contrast agent harmonic imaging. The transmit waveforms generated by the waveform generator 34 and the acoustic pressure waveforms transmitted from the transducer 16 (FIG. 1) are shaped to suppress ultrasonic energy in a wide passband centered at the harmonic center frequency at a region of interest along the ultrasound line.

The harmonics are suppressed by pre-distorting the acoustic waveform at the transducer (see FIG. 1). Pre-distortion accounts for harmonic information at the region of interest generated due to propagation non-linearity, generated due to device non-linearity or to combinations thereof. As used herein, "pre-distortion" of a waveform includes altering one or more characteristics of the waveform to increase, decrease or account for distortions to the waveform, such as device or propagation non-linearity.

Device Non-Linear Characteristics:

The quality of both tissue harmonic imaging and contrast imaging rely on forming the image from non-linearly generated higher harmonics in the body. There are numerous system factors or devices which degrade harmonic images by adding undesired non-linearity to transmit waveforms, such as second harmonic content. If the transmitted acoustic waveform has significant second harmonic content, then a portion of the resulting image may be formed from purely linear propagation and scattering of the second harmonic content.

In U.S. Pat. No. 5,608,690 and U.S. application Ser. Nos. 08/983,150 and 08/893,287 describe reducing the second harmonic content of transmitted electrical waveform through various means including digital and analog filtering of the transmitted waveform. However, devices within the transmission channel may add significant harmonic content to the transmitted acoustic waveform. For example, the transducer 16, the lens of the transducer 16, transmit multiplexers, other devices and combinations thereof add second harmonic or other undesired components.

Figure 7A:
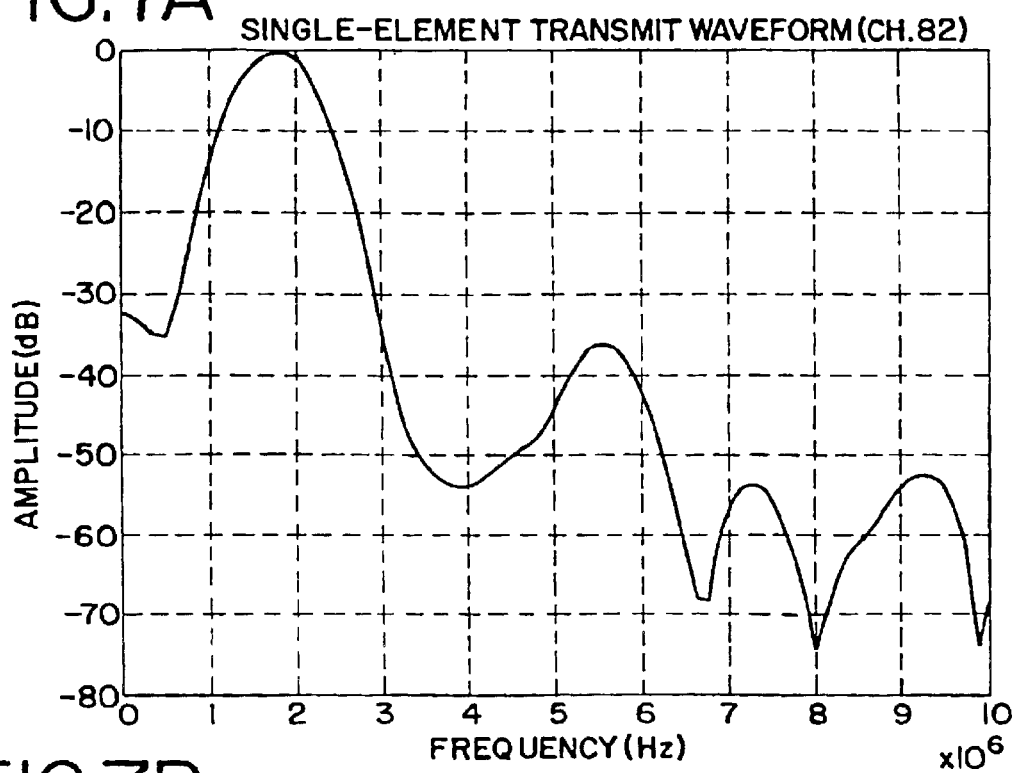
FIGS. 7A and 7B are graphical representations of spectra associated with transmit channel non-linear characteristics.
Figure 7B:
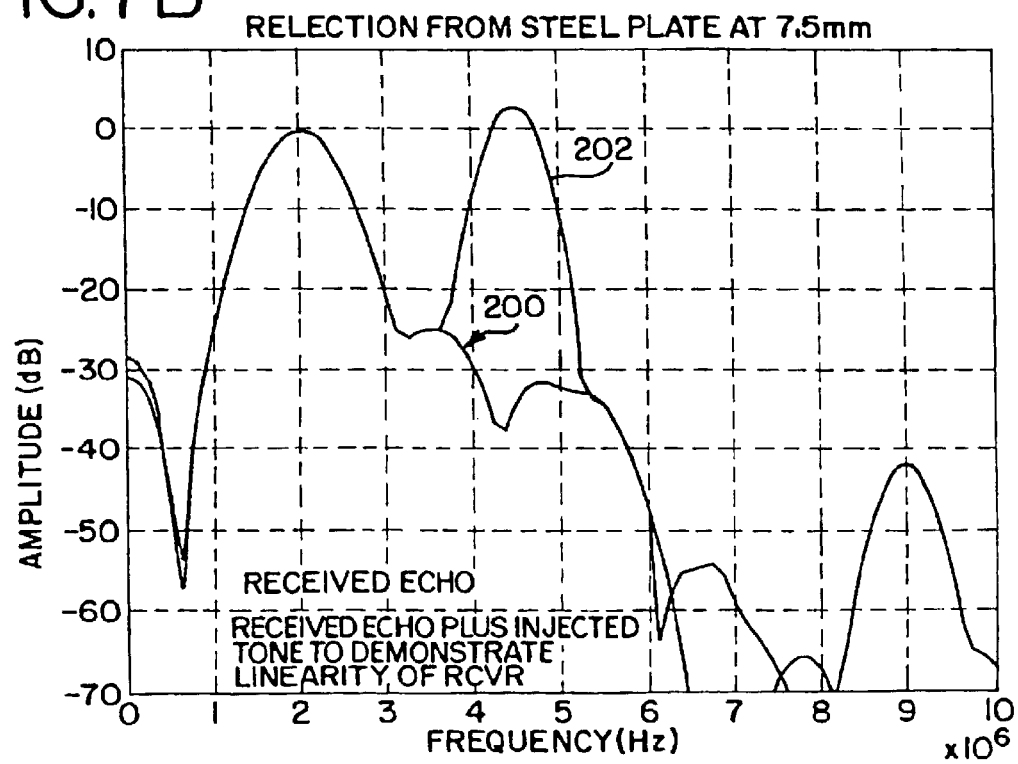
Figure 8A:
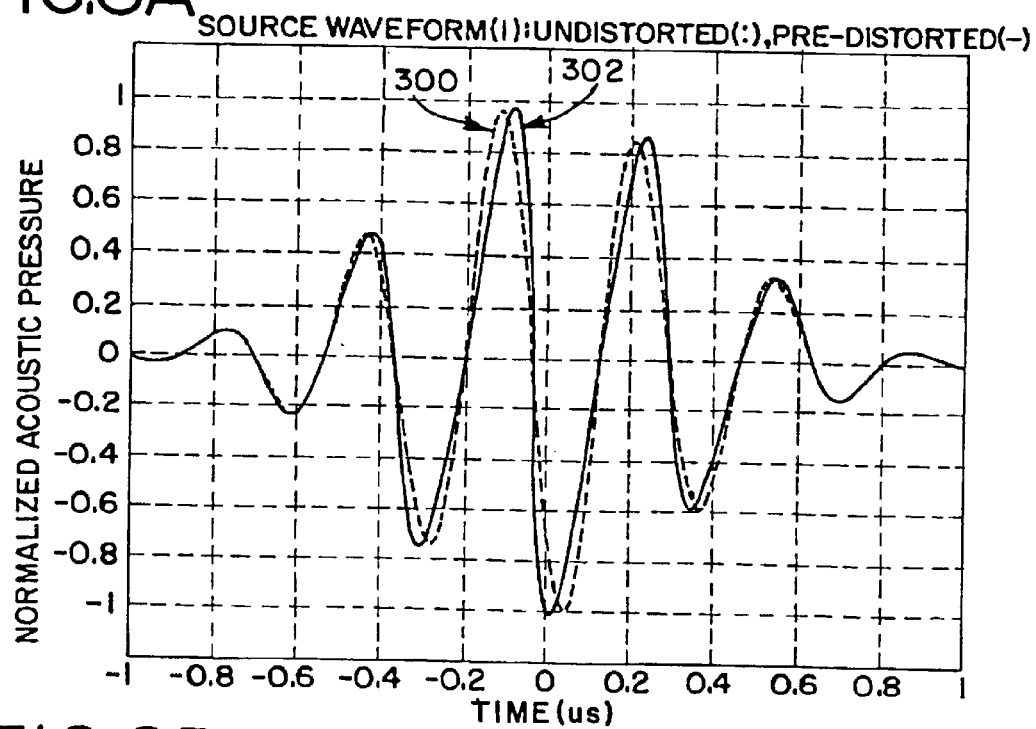
FIGS. 8A–D and 9A–D are graphical representations of pre-distorted waveforms, including fundamental and harmonic components and spectra.
Figure 8B:
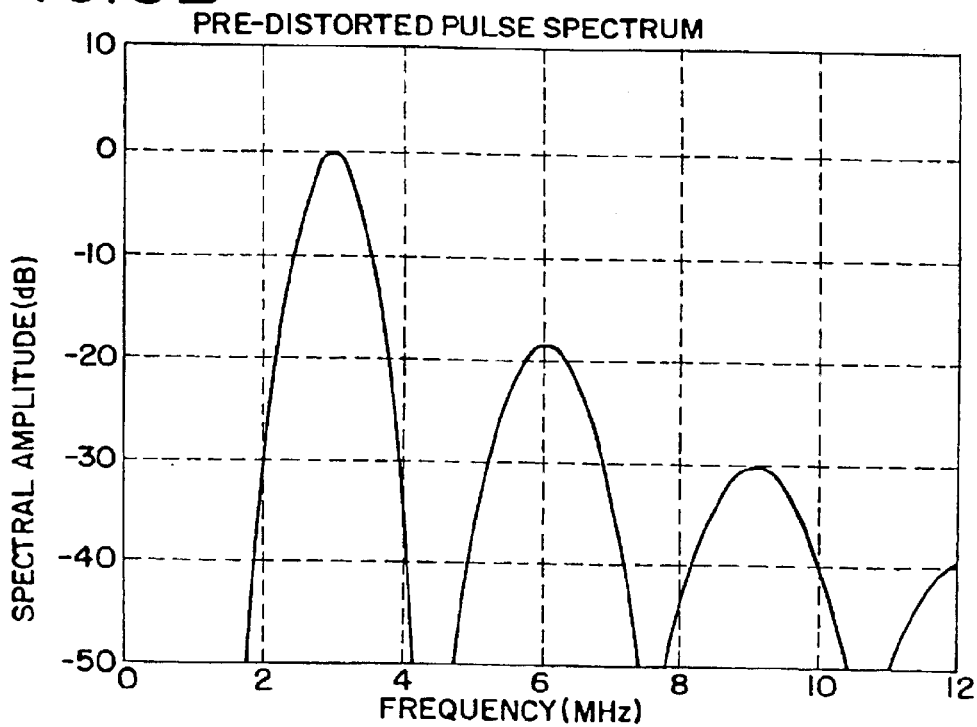
Figure 8C:
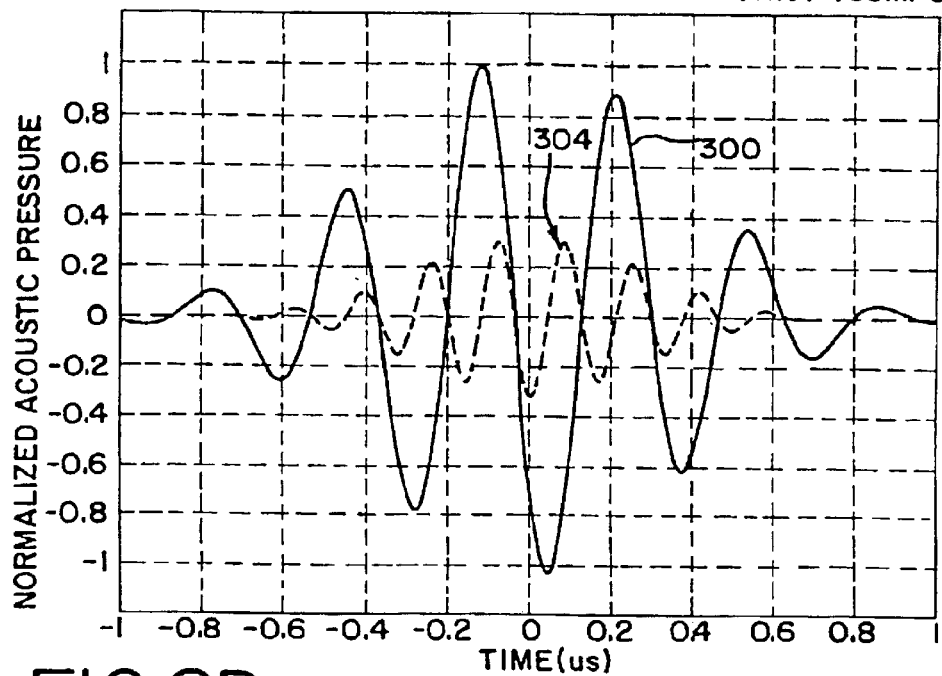
Figure 8D:
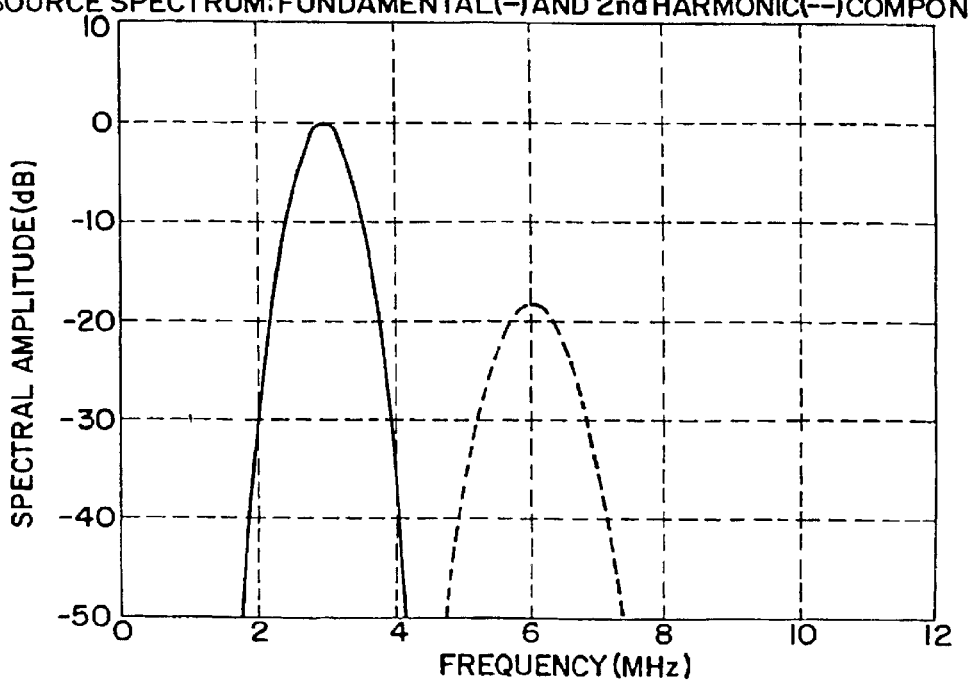
Figure 9A:
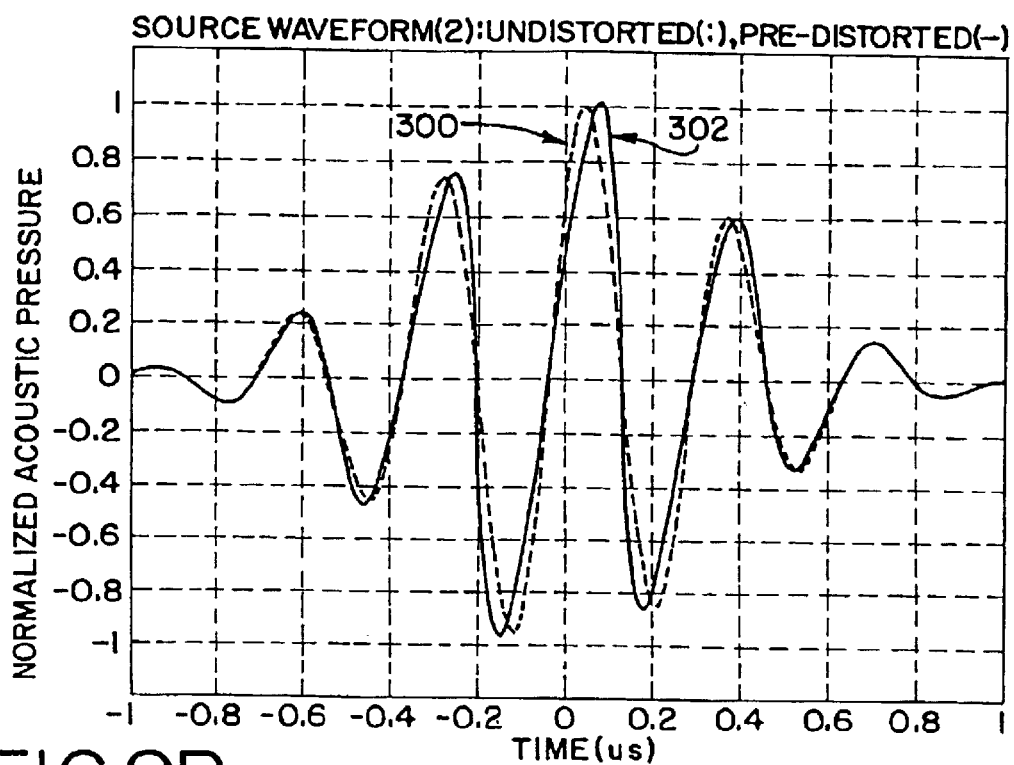
Figure 9B:
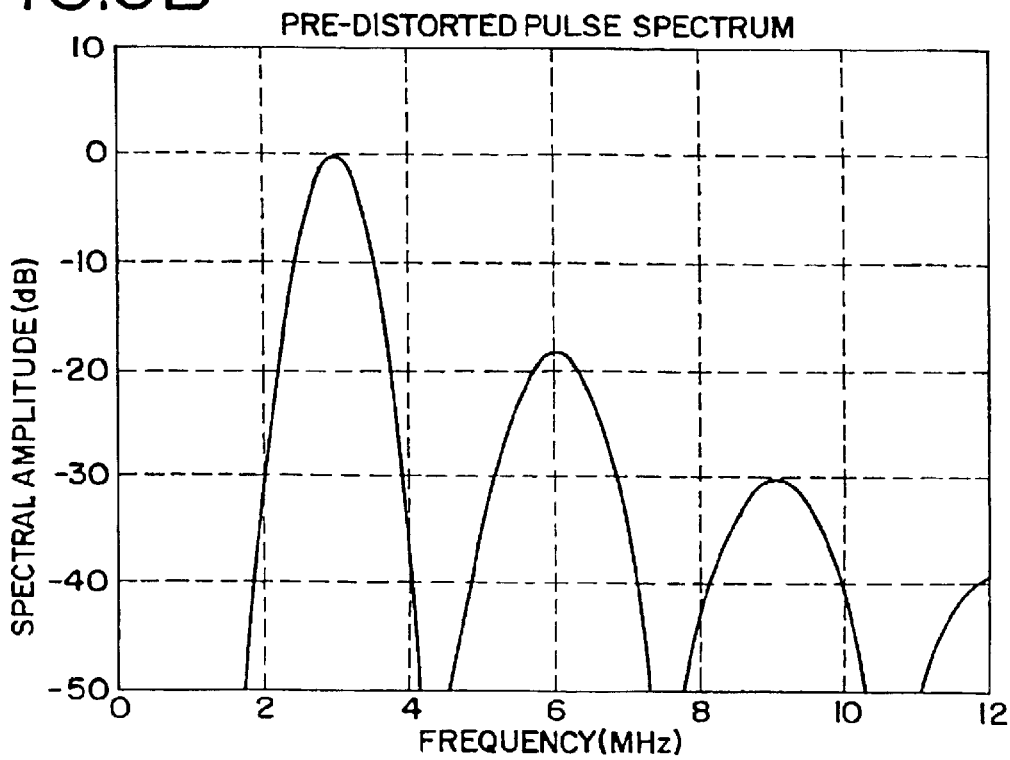
Figure 9C:
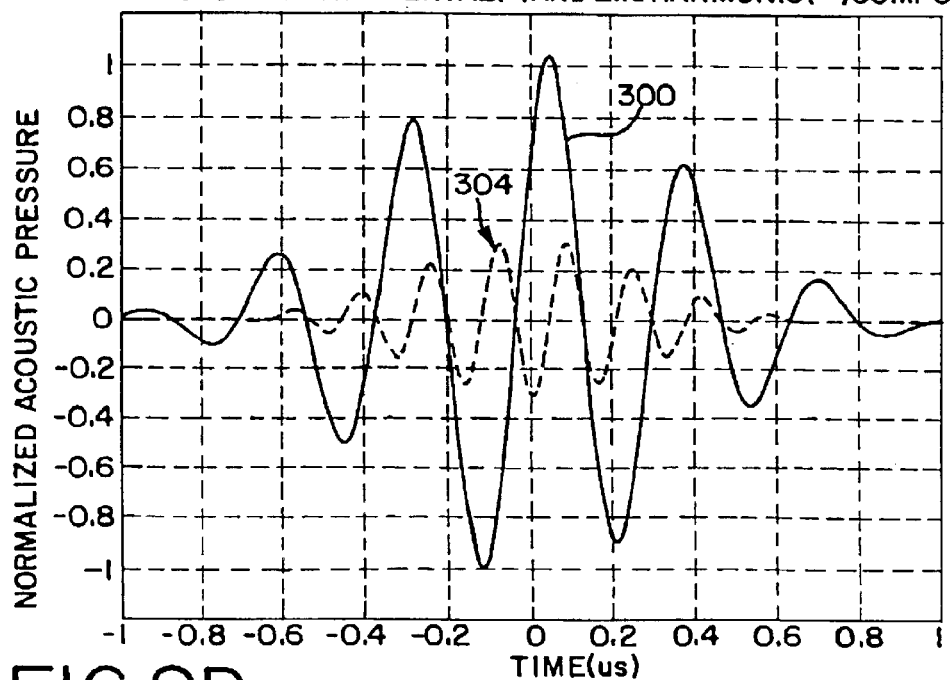
Figure 9D:
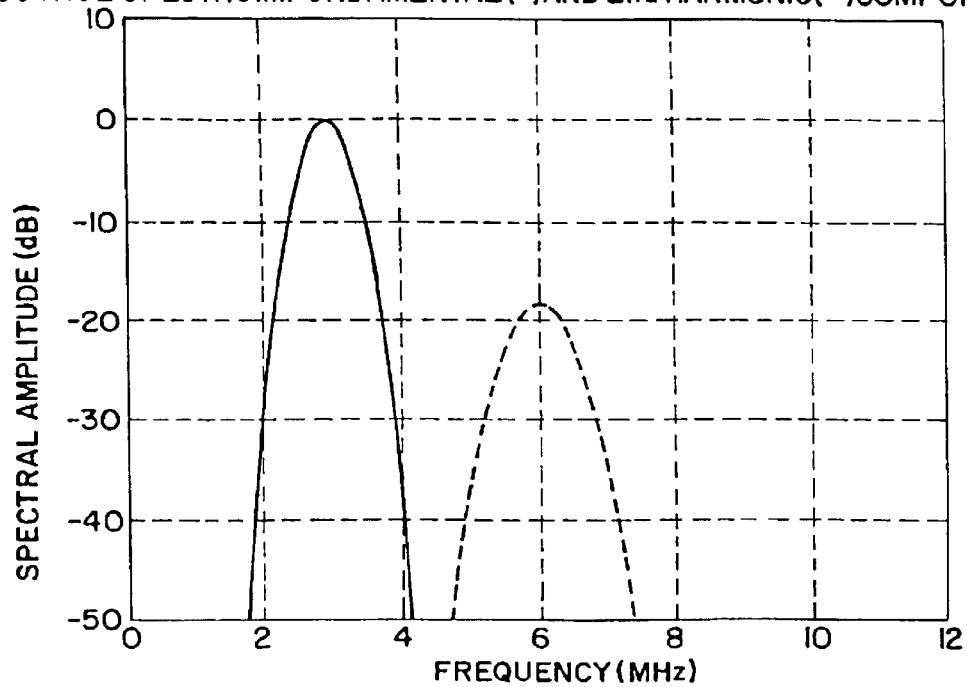

As shown in FIGS. 7A and 7B, the electrical waveform may not be linearly transformed into the transmitted acoustical waveform. FIG. 7A demonstrates a measurement of the voltage spectrum provided to a single transducer element. The electrical waveform depicted has been digitally filtered (pulse-shaping) to keep the second harmonic content low (approximately −50 dBC) as compared to the 0.0 dBC fundamental centered at approximately 1.75 MHz. FIG. 7B demonstrates the spectrum 200 of the received echo. The second harmonic content is roughly −25 dBC. Some of the additional second harmonic content may be from devices in the transmit channel.

A spectrum 202 demonstrates that the second harmonic content is not likely associated with the receive channel. The spectrum 202 is the result of the sum of the received echo plus a tone injected into the receivers at 4.5 MHz. There is very little energy at the second harmonic (9.0 MHz) of the reference tone. In order to correct for non-linearity introduced in the transmit channel, the electrical waveforms are pre-distorted.

To pre-distort the electrical waveform, a transmit waveform centered at the desired fundamental frequency is combined with a pre-distortion component, such as a component centered at the second harmonic of the fundamental. The pre-distortion component is preferably the same magnitude and 180 degrees out of phase with the distortion component introduced by one or more devices in the transmit channel.

Propagation Non-Linear Characteristics:

Other than pre-distortion to account for device non-linear characteristics, propagation non-linear characteristics may be accounted for by pre-distortion. By suppressing energies in the harmonic bands, less scattering at harmonic frequencies from tissue occurs. For example, at the region of interest, little or no energies are in the harmonic bands for scattering from tissue, so any harmonic energies are due to contrast agents. In comparison, an acoustic waveform with little or no harmonic energies at the source or transducer 16 (FIG. 1) results in greater harmonic energies as the waveform propagates. Adjacent to the transducer 16 (FIG. 1), to the region of interest and beyond, the energies associated with the harmonic bands increase. Signals scattered from tissue along the ultrasound line at many regions are associated with a greater energy level in the harmonic bands than if the harmonics due to propagation are suppressed by pre-distortion. For many regions along the ultrasound line, the ratio of energy in the harmonic band (1) due to non-linear scattering from contrast agents to (2) harmonic band energy due to tissue is increased when the harmonics due to non-linear propagation are suppressed. In tissue harmonic imaging, suppression of harmonics due to propagation is used to reduce aberration caused by a wall of a body. For example, the region of interest, as discussed below, is placed just beyond the wall.

Referring to FIG. 4A, an example of a pre-distorted acoustic pressure waveform 60 at one instant in time is shown. The pre-distorted waveform 60 comprises a plurality of frequency components, the first three of which are shown. Fundamental component corresponds to a center frequency of 3 megahertz, a bandwidth of 30 percent, measured at −6.8 dB from the peak, and a Gaussian envelope. The second harmonic component corresponds to a Gaussian envelope, a center frequency of 6 MHz, and a 21% relative bandwidth. Other waveforms with other center frequencies, envelopes and bandwidths may be used. Furthermore, frequency modulated signals may be used.

For reference, a dotted waveform 62 corresponding to an undistorted waveform is also shown. The undistorted waveform 62 corresponds to the desired waveform at a region along the ultrasound line. A cycle, such as one positive and one subsequent negative pulse, of the undistorted waveform 62 begins at a 0 amplitude value and a phase of 0 with respect to a phase of a fundamental component. The undistorted waveform 62 has a positive peak at 90 degrees phase, crosses 0 at 180 degrees of phase and has a negative peak at 270 degrees of phase. The undistorted waveform 62 returns to a 0 value at 360 degrees or 0 degrees of phase. The undistorted waveform 62 has positive and negative peaks that are half the distance between zero crossings. As described below, the undistorted waveform 62 corresponds to any of various waveforms used for harmonic imaging, such as sinusoidal, Gaussian or other waveforms.

For the pre-distorted waveform 60, positive peaks are delayed and negative peaks are advanced in time. As shown, a center of the amplitude distribution is also delayed and advanced in time for the positive and negative portions or pulses, respectively, of the pre-distorted waveform 60. Each pulse shown is defined or bounded by the zero values, where each zero value is adjacent a non-zero value. For example, two zero amplitudes 61 and 63 are part of the pulse associated with positive peak 64. The first zero amplitude 61 corresponds to a positive slope of the pulse and the second zero amplitude 63 corresponds to a negative slope of the pulse.

The pre-distorted waveform 60 shown in FIG. 4A is shown spatially, so the positive peak 64 is less and the negative peak 66 is more than half the distance between zero crossings. For example, the pre-distorted waveform 60 starts at a 0 value at 0 degrees of phase. The positive peak 64 is before the 90 degrees phase point, where phase is measured with respect to the center frequency associated with the fundamental component. The pre-distorted waveform 60 then returns to a 0 value or 0 crossing at 180 degrees of phase. Thus, the positive pulse of the pre-distorted waveform 60 is pre-distorted backwards in distance or forward in time (i.e. delayed in time) relative to the undistorted waveform 62. The negative peak 66 of the pre-distorted waveform 60 occurs after the 270 degrees of phase point. The amplitude then returns to a 0 value at 360 degrees or 0 degrees of phase. Thus, the negative peak 66 is pre-distorted forward in distance or backwards in time (i.e. advanced in time) relative to the undistorted waveform 62. Other waveforms distortions may be used, including more or less delay or advancing in time or distance and changing the positive or negative amplitudes from an advance or delay to delay or advance in time or distance, respectively. Furthermore, only one, all, or fewer than all of the pulses within a burst or waveform may be pre-distorted. The pre-distorted waveform 60 may also include a DC off-set.

As the pre-distorted waveform 60 propagates from the transducer 16 (see FIG. 1), the positive valued portions of the waveform 60, including the positive peak amplitude 64, propagate faster than the negative amplitude portions, including the negative peak amplitude 66. The pre-distorted waveform 60 or portions of the pre-distorted waveform 60 undistort. The relative change of the amplitudes is due to non-linear propagation. Referring to FIG. 4C, at a certain region along the ultrasound transmit line, such as a transmit focus or another region of interest, the pre-distorted waveform 60 preferably corresponds to the undistorted waveform 62. For example, the positive peak 64 is associated with 90 degrees of phase and the negative peak 66 is associated with 270 degrees of phase. Other desired or undistorted waveforms 62 may be used, such as waveforms with different carrier frequencies, envelopes and non-sinusoidal shapes.

As the waveform 62 continues to propagate past the region of interest, the position of the positive amplitudes and negative amplitudes relative to the 0 values and each other continues to change. For example, as shown by the distorted waveform 68 in FIG. 4E, the positive peak 64 is associated with a point past 90 degrees of phase or is advanced in distance or delayed in time relative to the zero values and the negative peak 66 is associated with a point prior to 270 degrees of phase or is delayed in distance or advanced in time relative to the zero values.

Figure 4D:
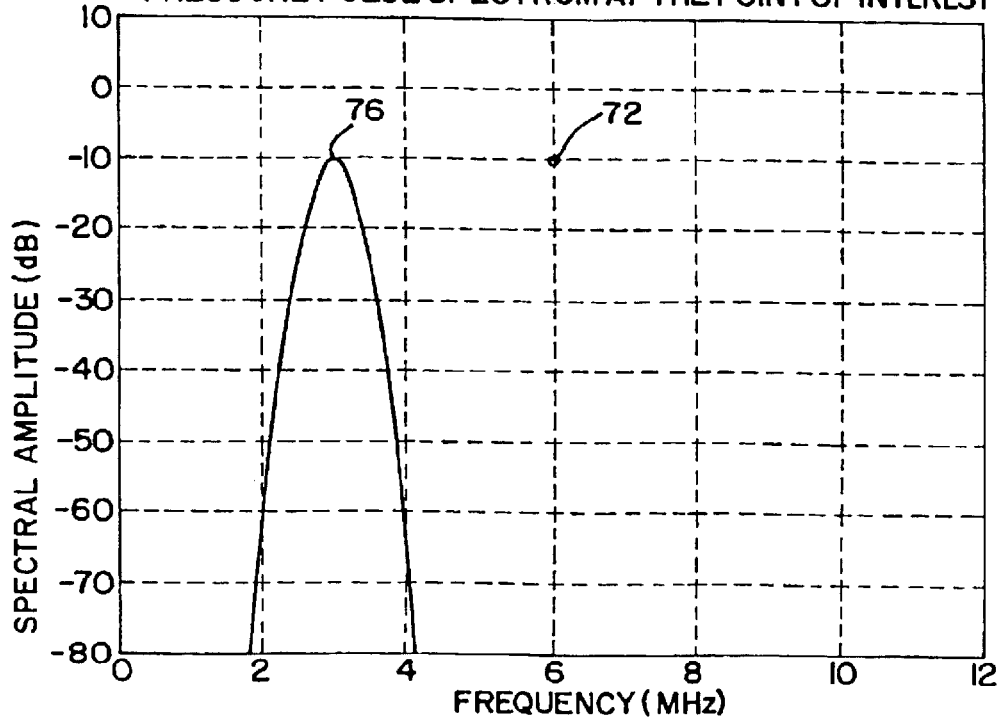
Figure 4E:
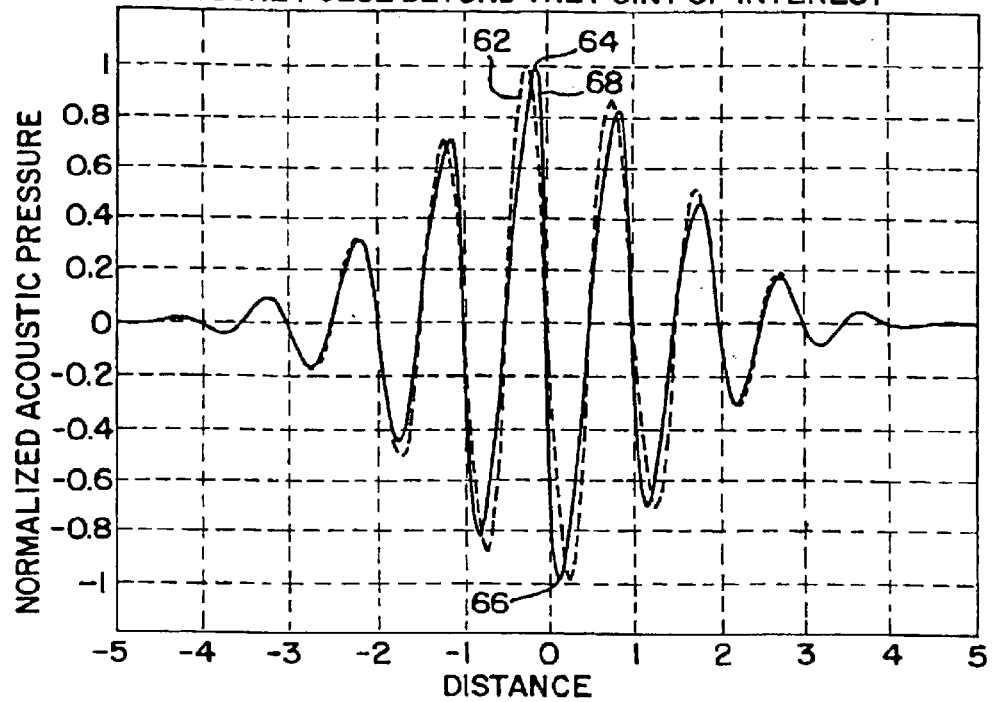

Referring to FIGS. 4B, D and F, the spectra associated with the pre-distorted waveform at the source, at the region of interest, and beyond the region of interest are shown generally at 70, 72 and 74, respectively. Referring to FIG. 4B, the spectrum includes a fundamental band 76 around the 3 megahertz center frequency, a second order harmonic band 78 around the second order harmonic frequency of 6 megahertz, and a third order harmonic band 80 around the 9 megahertz third order harmonic. Other frequency bands and amplitudes may be used. Moving the positive amplitudes backward or moving the negative amplitudes forward in distance relative to the zero values corresponds to adding the second and third order harmonic bands 78 and 80. The peak amplitude of the second order harmonic band 78 is a value down from a peak amplitude of the fundamental band 76, such as approximately 22 dB down. As the waveform propagates, the amplitude of the harmonic bands 78 and 80 decreases in amplitude. At the region of interest, corresponding to a waveform where the peak positive amplitude is 90 degrees of phase and the peak negative amplitude is at 270 degrees of phase in this example, the harmonic bands 78 and 80 are reduced as shown in FIG. 4D. Thus, the harmonic energies due to propagation are suppressed along the ultrasound transmit line at regions before, at and after the region of interest as compared to harmonic energies associated with transmitting the desired waveform from the transducer. For example, the amplitude of the second order harmonic is suppressed by 4 dB or more at the point of interest. As shown, the peak amplitude of the second order harmonic band 78 is more than 40 dB down from the peak amplitude of the fundamental band 76. Other levels of suppression are possible.

Figure 4F:
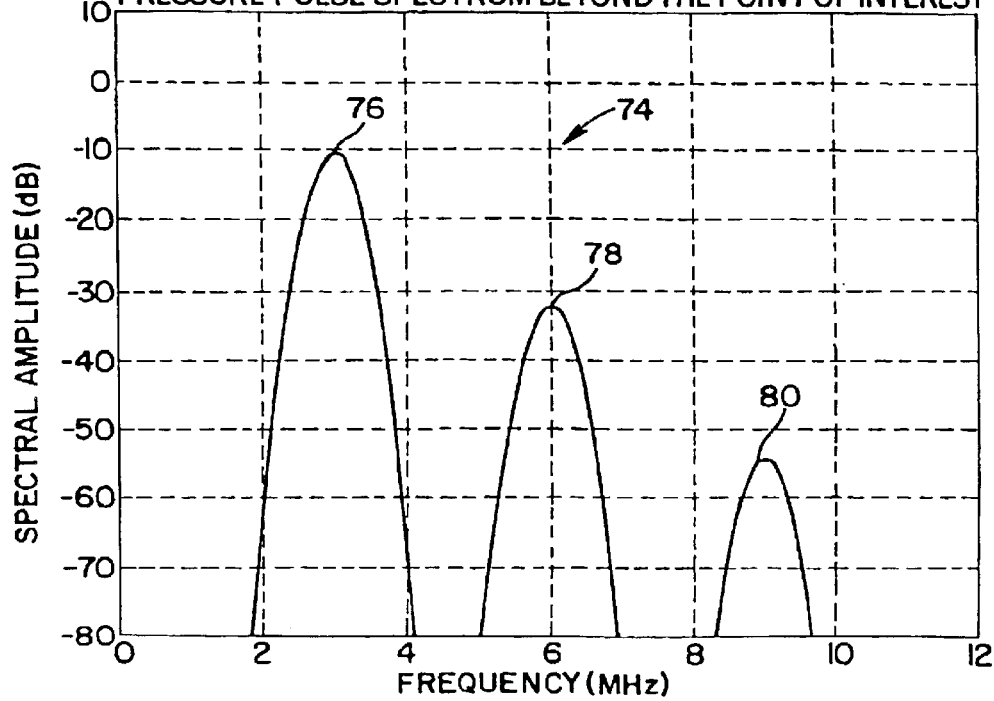

Referring to FIG. 4F, as the waveform continues to propagate, the non-linear distortion process of the waveform 60 (FIG. 4E) generates energies in the harmonic bands 78 and 80. Since the harmonic bands 78 and 80 associated with regions past the region of interest correspond to a positive peak moved forward and a negative peak moved backwards in distance, the harmonic bands 78 and 80 are 180 degrees out of phase with the corresponding harmonic bands 78 and 80 of FIG. 4B. As the waveform at the transducer 16 (FIG. 1) propagates to adjacent the transducer and to the region of interest, the peak of the harmonic bands 78 and 80 decreases relative to the peak of the fundamental band 76. Past the region of interest, the peak of the harmonic bands 78 and 80 increases relative to the peak of the fundamental band 76. The harmonic energies due to propagation are suppressed along the ultrasound transmit line beyond the region of interest in comparison to transmitting the desired waveform from the transducer.

FIG. 4, as discussed above, corresponds to attenuation normalized waveforms. The changes in the peaks discussed above are in addition to any changes attributable to attenuation. As any waveform propagates from a source in the acoustic domain, the amplitude of the waveform and the corresponding amplitude in the frequency domain decrease due to mechanisms of dissipation (e.g. viscosity, thermal conduction, molecular thermal relaxation, etc ... ). The rate of decrease attributable to attenuation may be greater than the rate of increase of the peak of the second order harmonic or other harmonic bands 78 and 80 after the region of interest. Attenuation normalized waveforms are more indicative of geometric effects such as focal gain and non-linear effects.

Attenuation normalization is a scheme in which the waveform at any particular depth is compensated in amplitude for losses attributable to attenuation incurred during propagation for the source (the transducer). This compensation is done in the frequency domain. Each frequency component, such as the fundamental or the second harmonic frequency component, is increased in amplitude by a number of dB that is an estimate of the attenuation to which the particular frequency component was subject. For example, a burst is transmitted wherein the fundamental center frequency is at 4 MHz and the second harmonic center frequency is at 8 MHz. The distance from the center of the transmit aperture to the point of interest is 4 cm. The estimated loss incurred by the fundamental due to the various dissipative loss mechanisms is approximated as 0.5 dB/cm/MHz, where 0.5 dB/cm/MHz is a typical value for the rate of attenuation by tissue. Thus, the loss in the example is (0.05 dB/cm/MHz)(4 cm)(4 MHz)=8 dB. The estimated loss for the second harmonic component is (0.5 dB/cm/MHz) (4 cm)(8 MHz)=16 dB. The fundamental and second harmonic levels are normalized or adjusted for attenuation by increasing their levels by 8 and 16 dB, respectively.

While this model for the estimation of the incurred attenuation is typically used to estimate fundamental losses, it may be used to approximate attenuation for the second harmonic as well. Any second harmonic that is generated at the source will undergo the same variety of linear energy losses as the fundamental in propagation to the point of interest. The second harmonic generated in the volume of tissue between the source and the point of interest due to nonlinear propagation is also generally represented by the model. The portion of the second harmonic generated 1 cm along the 4 cm path to the point of interest is generated at a rate that is proportional to the square of the fundamental level. The fundamental undergoes 0.5 dB/cm/MHz*1cm*4 MHz=2 dB of attenuation in the first cm, so the second harmonic generated at 1 cm is impacted by 4 dB. The attenuation incurred by the resultant second harmonic over the remaining 3 cm path is given by 0.5 dB/cm/MHz*3cm*8 MHz=12 dB, for a total of 16 dB of attenuation (the same as if the second harmonic were generated at the source). Other attenuation normalization schemes or models to isolate nonlinear effects from attenuation effects may be used.

The attenuation may also be measured, instead of using the 0.5 dB/cm/MHz, using other values or other models. Measurements are used for tissues where the attenuation rate is not known. A transducer is placed on a tissue mimicking phantom with a known, calibrated attenuation rate of X dB/cm/MHz. The mean speckle level (LP1 and LP2) is estimated at two successive ranges, R1 and R2, such as by acquiring gray scale or B-mode intensity data for a region of several speckle cells (6 or 7) and averaging the data. The same measurement at the ranges is made while scanning homogeneous tissue, such as thyroid tissue (LT1 and LT2). The attenuation rate, Y, is X+((LT2−LT1)−(LP2−LP1))/(2 (R2−R1)f), where f is the center frequency of the imaging burst. The accuracy of the measurement improves as the difference between R1 and R2 increases. The measurement is preferably made using low transmit power settings to avoid including nonlinear propagation effects. The measurement is made at the frequencies of interest, such as a first measured value at the center fundamental frequency and a second measured value at the center second order harmonic frequency. The measured attenuation rates are then applied to the relevant frequencies as discussed above, such as normalizing the fundamental spectral component with the first measured value and the second order harmonic component with the second measured value. Other measurements are possible.

In order to determine the amount of advance or delay in distance for pre-distorted waveforms 60, any of a number of non-linear propagation models may be used. For example, the model disclosed by M. A. Averkiou, Y. S. Lee and M. F. Hamilton in "Self-demodulation of amplitude and frequency modulated pulses in a thermoviscas fluid", J. Acoust Soc. Am. 94, 2876–2883 (1993) is used. Given the acoustic waveform as a function of position in the transmit aperture or along the transducer 16, such models are capable of predicting the propagation of the resultant waveform as it leaves the transducer 16 (FIG. 1) and continues to propagate along the ultrasound transmit line. By selecting a waveform with the desired frequency content at a region of interest, such as the mechanical or electrical delay focal region, along the ultrasound transmit line, the models are reverse propagated or reversed in time to determine the waveform at the transducer 16. Thus, what an initial waveform was to result in the desired waveform is determined for each channel. For example, the desired waveform 62 shown in FIG. 4C and its corresponding spectrum 72 shown in FIG. 4D are to be used for imaging contrast agents as discussed below. The desired waveform 62 is reversed propagated to determine the pre-distorted waveform 60 as shown in FIG. 4A necessary to generate the desired waveform 62 of FIG. 4C.

Another modeling technique for generating the desired waveform 62 is to use one acoustic waveform with a particular desired frequency content modeled at the source or transducer 16 (FIG. 1). Using a very low transmit amplitude for each channel, the propagation of the waveforms is modeled to the region of interest, such as near the focal region. Due to the low amplitude, preferably no significant non-linear distortion occurs. The waveform at each point in the focal plane is derived from the model. This set of waveforms is amplified to an amplitude typical of ultrasound acoustic waveforms. The amplitude level preferably corresponds to FDA limited amplitudes and may correspond to the ability of any contrast agents to absorb the energy without destruction. The model is then reversed in time, and the large amplitude waveforms are back propagated towards the transmit aperture. Since the waveforms typically vary only a little from transducer element-to-element and for simplicity, the waveform at the surface of the source and at the center of the transmit aperture is used for each channel or element.

As an example of the waveform distortion predicted by the model, the positive pulse peaks travel at $c_0+\beta u_0$ and the zero-crossing amplitude values travel at $c_0$ in meters/second, where $\beta$ is the coefficient of non-linearity, $c_0$ is the speed of sound in tissue, and $u_0$ is the peak particle velocity. The peak particle velocity corresponds to the motion generated as an acoustic wave passes a point. The speed of sound for soft tissue is approximately 1,540 meters per second, and the coefficient of nonlinearity is typically between 5 and 7. The positive amplitudes travel at $\beta u_0$ relative to the zero amplitudes. After propagating a distance of one wave length, $\lambda$, the positive amplitudes of the waveform are advanced in time by $\beta\epsilon$, where $\epsilon$ is the acoustic Mach number and equal to $u_0$ divided by $c_0$. Typically, $\epsilon$ is 0.001 to 0.002 for peak amplitudes corresponding to FDA limited ultrasound at the focal region. The negative peaks travel at $c_0-\beta u_0$ The amount of delay or advance is determined based on the number of wavelengths to the region of interest. Preferably, the region of interest is based on user selection. For contrast agent harmonic imaging, the region of interest and the focal region are preferably the same region along the ultrasound transmit line. Referring to FIG. 4A, the positive and negative peaks 64 and 66 are displaced by more than 2% of a distance corresponding to a cycle or the period of a fundamental component of the waveform. Preferably, the peaks 64 and 66 are displaced by 5–20%. Displacing the peaks by 2% corresponds to adding a harmonic spectral component that is approximately 40 dB down from the peak of the fundamental spectral component.

The amplitude, as a function of distance, of the second harmonic peak in the frequency domain near the region of interest, $P_2(z)$, is approximately $\frac{1}{2}\beta\epsilon^2 w_0 P_0 c_0 z$, where $w_0$ equals $2\pi f_0$, where $f_0$ is the center frequency, and $P_0$ is the density for tissue, such as $10^3$ Kg/m$_3$. To determine the amplitude of the second harmonic relative to the fundamental at one wave length from the point of interest, $P_2(z)$ is normalized by the level of the fundamental band at the point of interest, $P_1(0)$. $P_2(z)/P_1(0)$ is $\beta\epsilon\pi z/\lambda$.

Waveform Generation:

Once the pre-distorted waveform for each channel is determined, the waveform is separated into two components in the preferred embodiment. To apply the pre-distortion in the embodiment of FIG. 3, one beam is programmed with a desired apodization, delay and pulse-shaping profiles in the conventional manner, such as the waveforms generated by waveform generator 50. A second beam provides the pre-distortion component, such as the waveforms generated by the waveform generator 52.

Figure 5A:
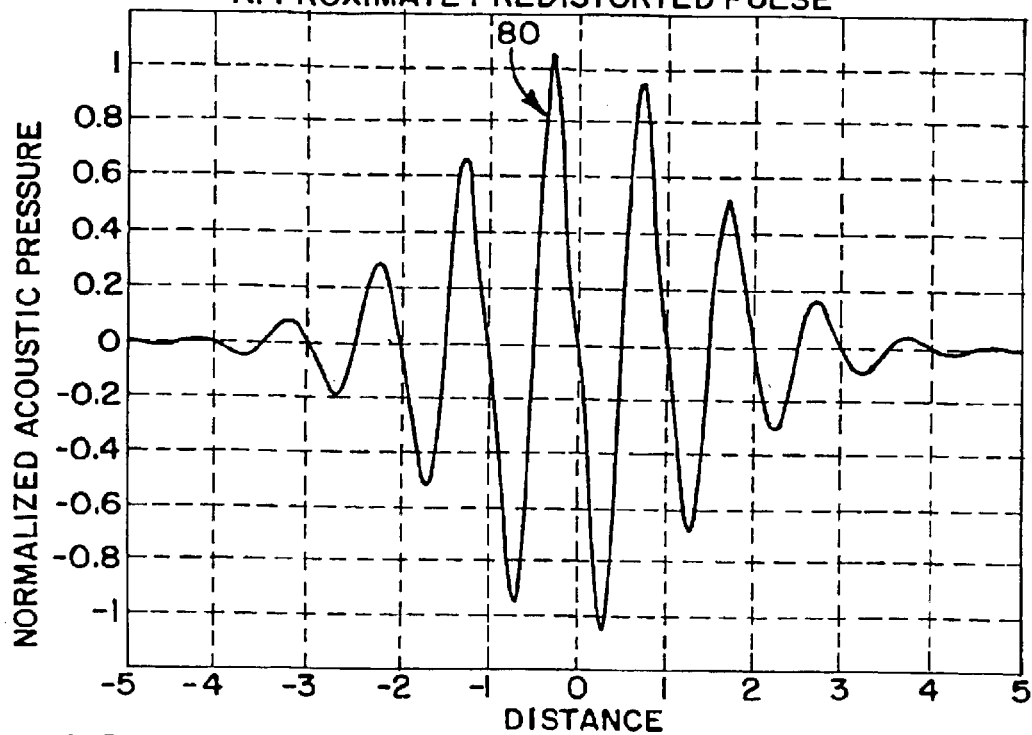
FIGS. 5A and B are graphical representations of an acoustic waveform and the corresponding spectrum.
Figure 5B:
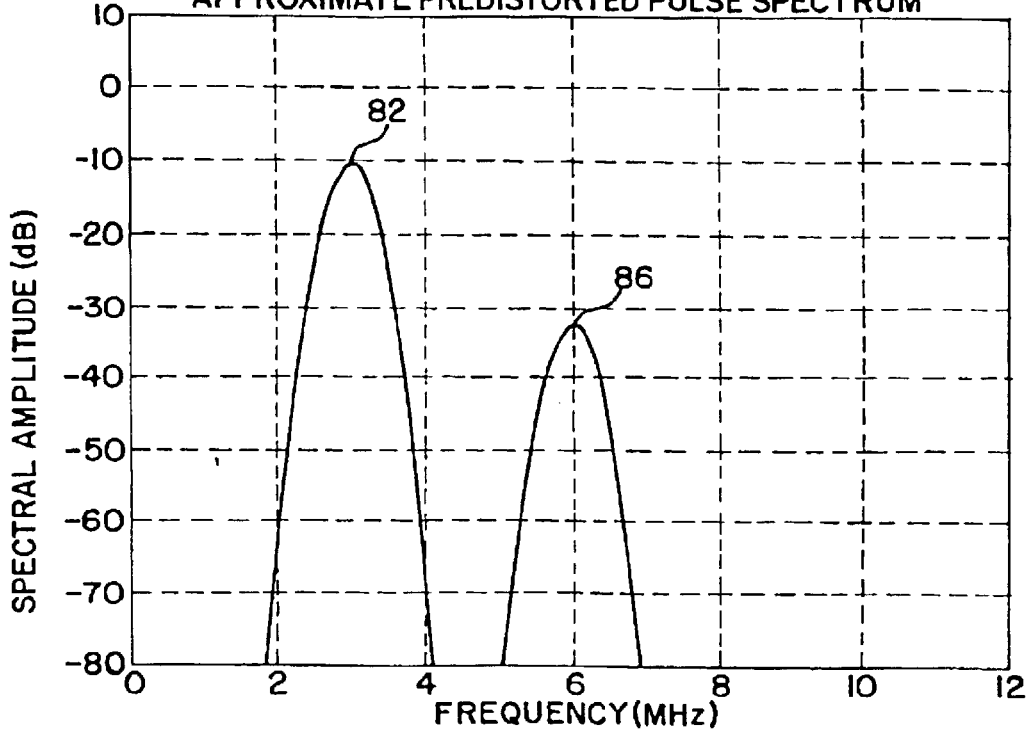
FIGS. 5C and D are graphical representations of a fundamental component of the acoustical waveform of FIG. 5A and the corresponding spectrum.
FIGS. 5E and F are graphical representations of a harmonic component of the acoustical waveform of FIG. 5A and the corresponding spectrum.

Referring to FIGS. 5A and B, the fundamental band 82 is isolated. In particular and referring to FIGS. 5C and D, a waveform 84 corresponding to the fundamental band 82 is determined. Referring to FIGS. 5E and F, a waveform 88 corresponding to the desired harmonic component (pre-distortion component), such as the second order harmonic band 86, is also determined. By summing these waveforms 84 and 88, the transmit waveform for generating the acoustic pre-distorted waveform 80 is generated. The transmit waveform is pre-distorted to account for any transducer and system frequency responses, propagation and combinations thereof. While the discussion below generally deals with the fundamental and harmonic components as separate waveforms, much of the discussion applies equally to a conceptual understanding of a single waveform, the pre-distorted waveform, as having fundamental and harmonic components.

Figure 5C:
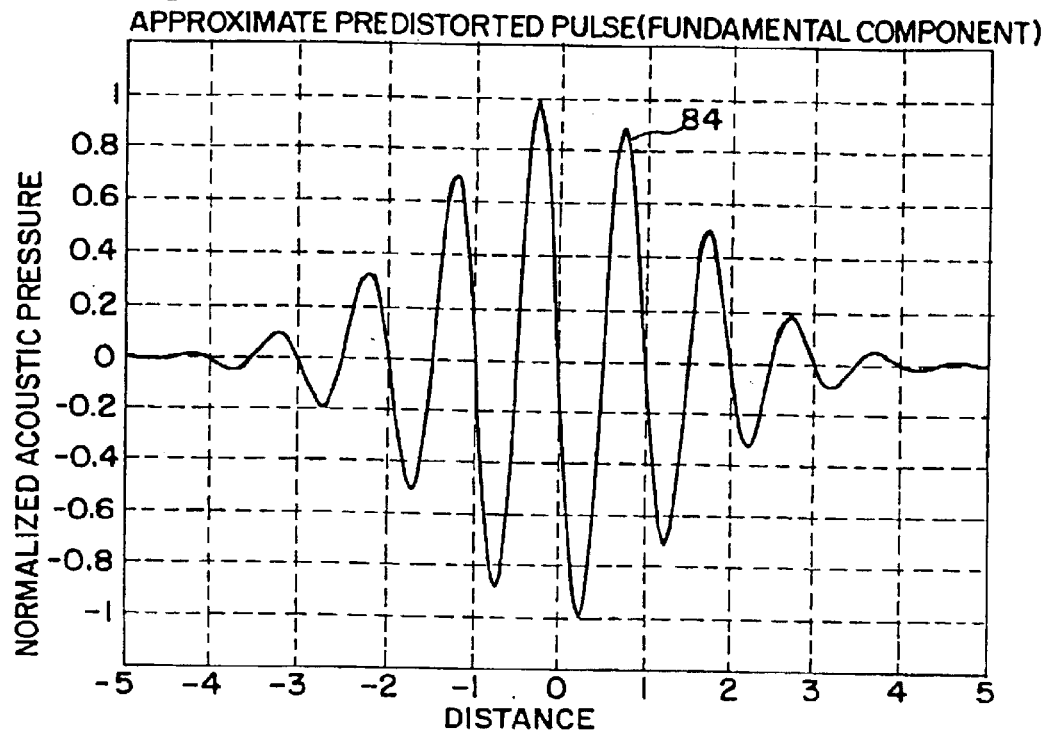
Figure 5D:
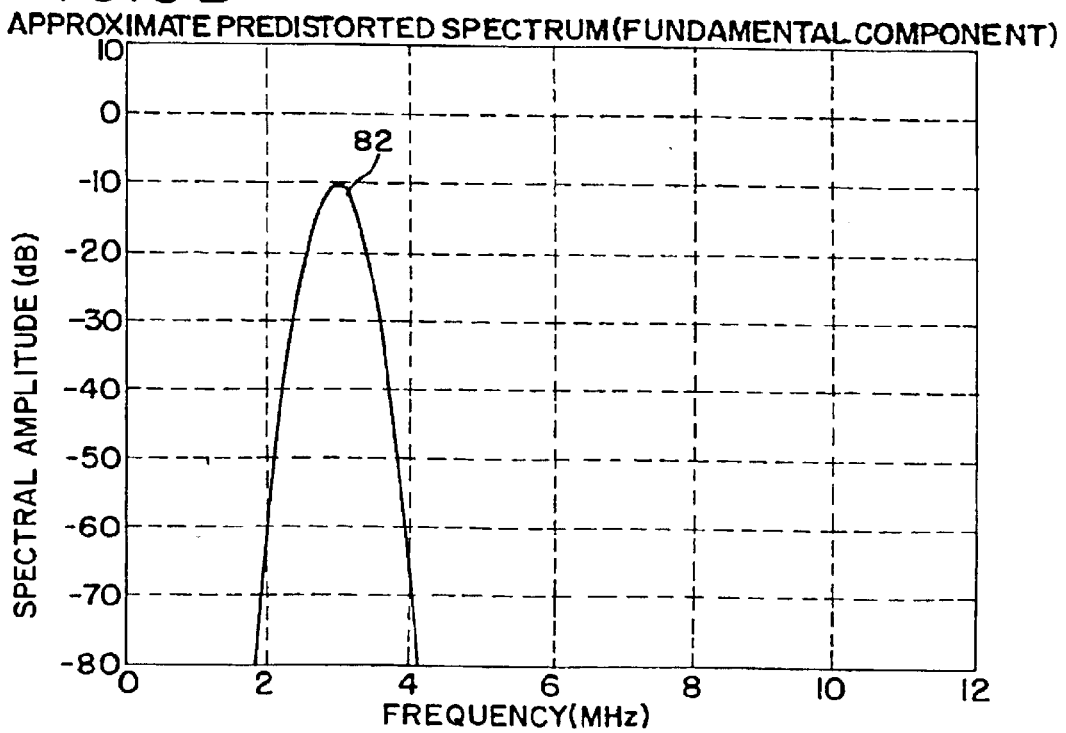
Figure 5E:
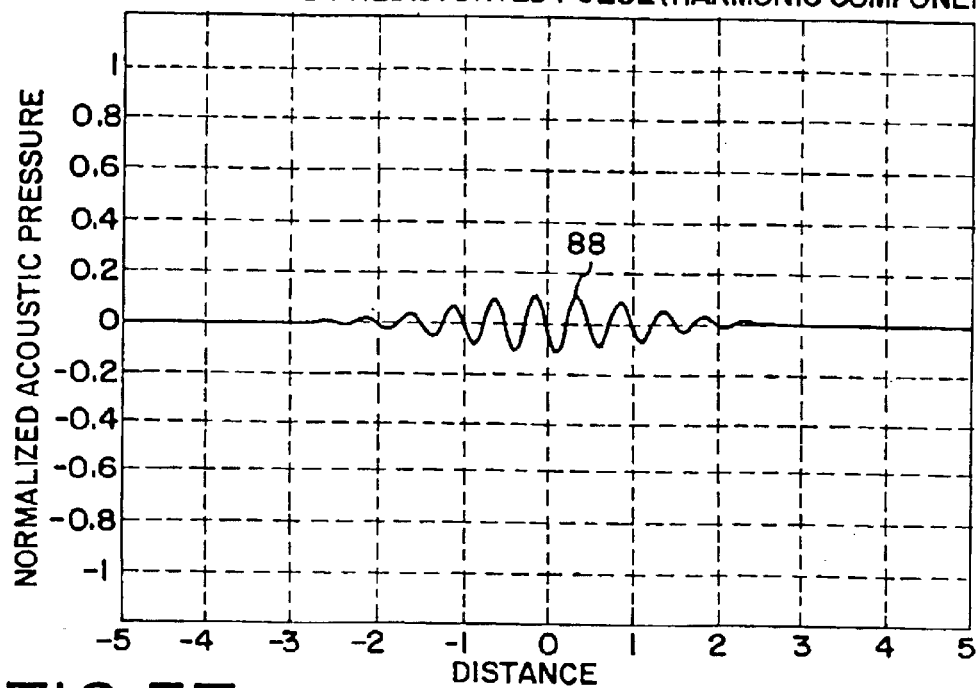
Figure 5F:
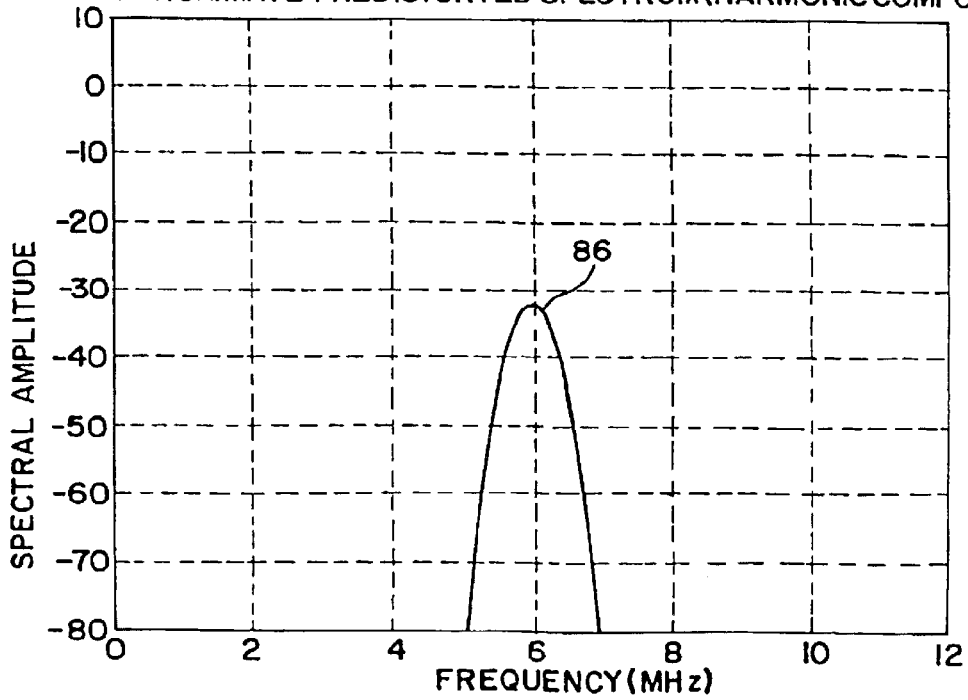

Referring to FIGS. 5C and E, the waveform 84 corresponding to the fundamental band has an amplitude or envelope, a center frequency, a bandwidth and a phase. The waveform 88 corresponding to the harmonic band also has an amplitude, a bandwidth, a center frequency and a phase. The bandwidth, amplitude and center frequency of the fundamental band waveform 84 are chosen as is well known in the art for harmonic imaging. The amplitude, phase, bandwidth, and center frequency of the harmonic band waveform 88 are chosen in order to provide maximum suppression of the harmonic band 86 at the region of interest, such as through the use of the model and transmit channel considerations.

Generally, for a Gaussian fundamental pulse of a given center frequency and bandwidth, the second harmonic center frequency is twice the fundamental center frequency, and the second harmonic relative bandwidth, measured at points −6.8 dB from the peak, is less than the fundamental bandwidth by a factor of the square root of 2. For example, the 3 MHz, 30% bandwidth fundamental waveform 84 corresponds to a 6 MHz, 21% bandwidth second harmonic waveform 88. The phase of the second harmonic is determined by use of the model or empirically, but is typically aligned as discussed below. The second harmonic phase is such that the positive-going zero-crossings associated with the fundamental and second harmonic components of the waveform are aligned (for temporal waveforms). For unaligned waveforms, at least one negative slope zero-crossing associated with a second order harmonic component occurs within a quarter period of a negative slope zero-crossing associated with the fundamental component, where the period is the period of the fundamental component. The zero-crossing associated with the harmonic component is before or after the zero-crossing associated with the fundamental component. Other phase alignments are possible. The second harmonic amplitude is generally proportional to the square of the fundamental amplitude. If the amplitude of the fundamental component is increased by 3 dB, the second harmonic amplitude generally increases by 6 dB. The absolute value of the second harmonic amplitude, given a fundamental amplitude, is determined by use of the model and/or empirically. The waveforms may be characterized in other ways. Furthermore, the discussion above is based on only one particular harmonic and not the full spectrum for simplicity. The system 10 may generate waveforms including the full spectrum and taking into account the bandwidth of the system and transducer 16 (FIG. 1) or only selected portions of the spectrum. Other waveforms may also be used.

The discussion above is based on one transmit waveform applied with different delays and amplitude to each of the plurality of channels. The pre-distortion component preferably has an identical delay profile as the fundamental component. The delay profile determines the depth of focus and the amplitude profile determines the apodization. Identical apodization may also be applied to each of the two components. This approach is in general sufficient to reduce the harmonic level in a particular region of interest along the ultrasound beam. Either the transmit waveform is delayed and amplitude adjusted across an aperture width, or the harmonic waveform 88 and fundamental waveform 84 are amplitude adjusted or delayed separately prior to summation. Furthermore, one transmit waveform may be generated and copied for each channel as part of the design process or as part of the transmission process.

In order to better reduce the harmonic level throughout the main lobe of the transmit beam, the apodization of the harmonic beam is adjusted separately from that of the fundamental beam. The level of the harmonic as compared to the fundamental varies from channel to channel such that the transducer is conceptually transmitting two coincidental beams, one fundamental and the other harmonic. For example, the apodization of the harmonic beam is narrower than the apodization of the fundamental beam by a factor of approximately the square root of two. The actual function is determined experimentally or as described herein using modeling.

The aperture width may also be different for the harmonic beam than for the fundamental beam. For example, the harmonic beam has an appropriate aperture width and apodization to match the structure of the non-linearly generated second harmonic in the focal plane. In order to achieve this match, the effective width of the second harmonic beam aperture is less than the width of the fundamental beam by a factor of approximately the square root of two. Other functions may be used.

In order to optimize the region (range of depths) over which effective suppression takes place, the delay profile is different for the harmonic beam than for the fundamental beam. For example, the focal depth of the harmonic beam is deeper than the focal depth of the fundamental beam.

In general, the aperture width, apodization, and focal depth of the harmonic relative to the fundamental beam effects both the distribution of harmonic energy in the focal plane (transverse harmonic structure) and along the ultrasound line (axial harmonic structure). Fine tuning, such as through empirical testing, may improve one or both or transverse and axial suppression.

Figure 6A:
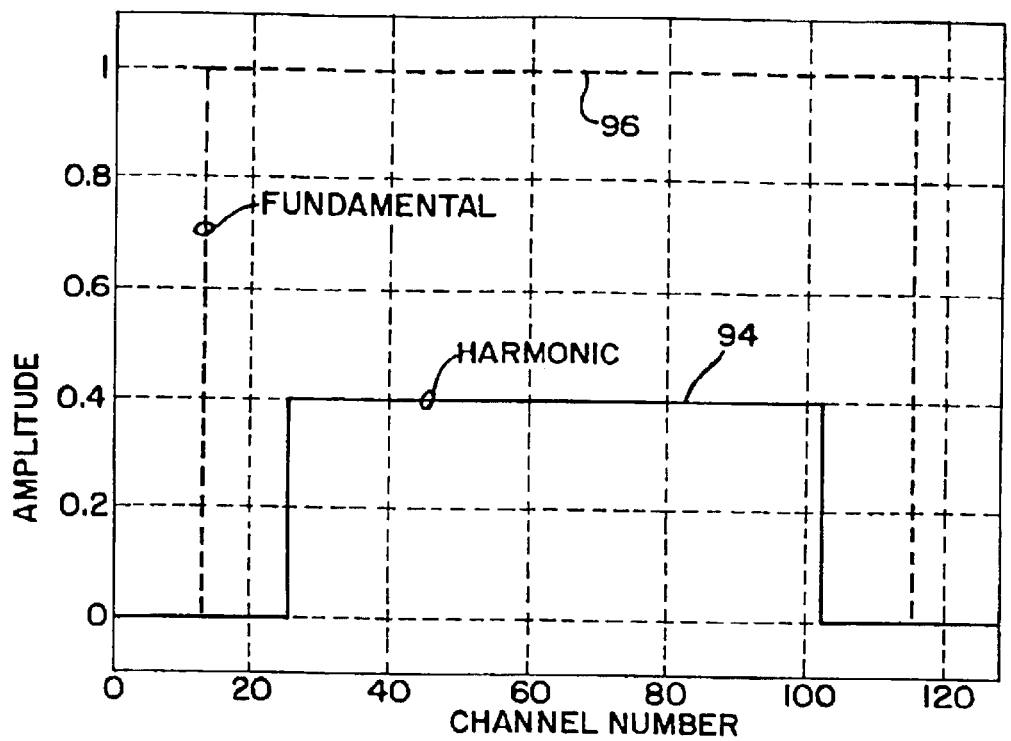
FIGS. 6A and B are graphical representations of fundamental and harmonic beam aperture widths and apodization.
Figure 6B:
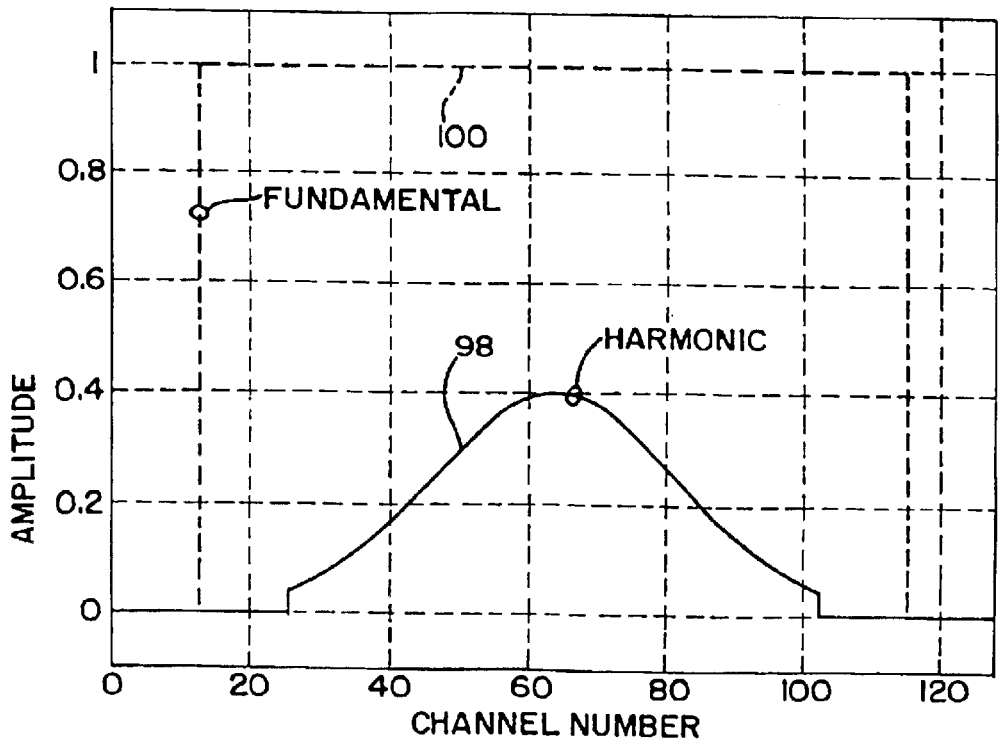
FIGS. 6C and D are graphical representations of fundamental and harmonic beam aperture widths and delay profiles.
Figure 6C:
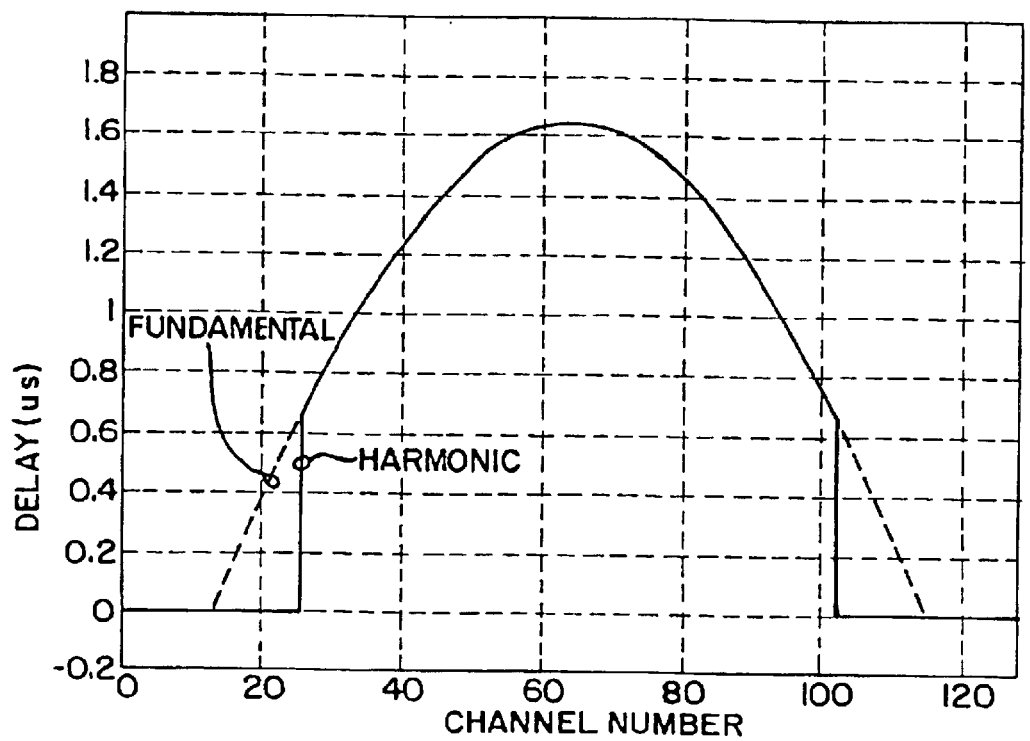
Figure 6D:
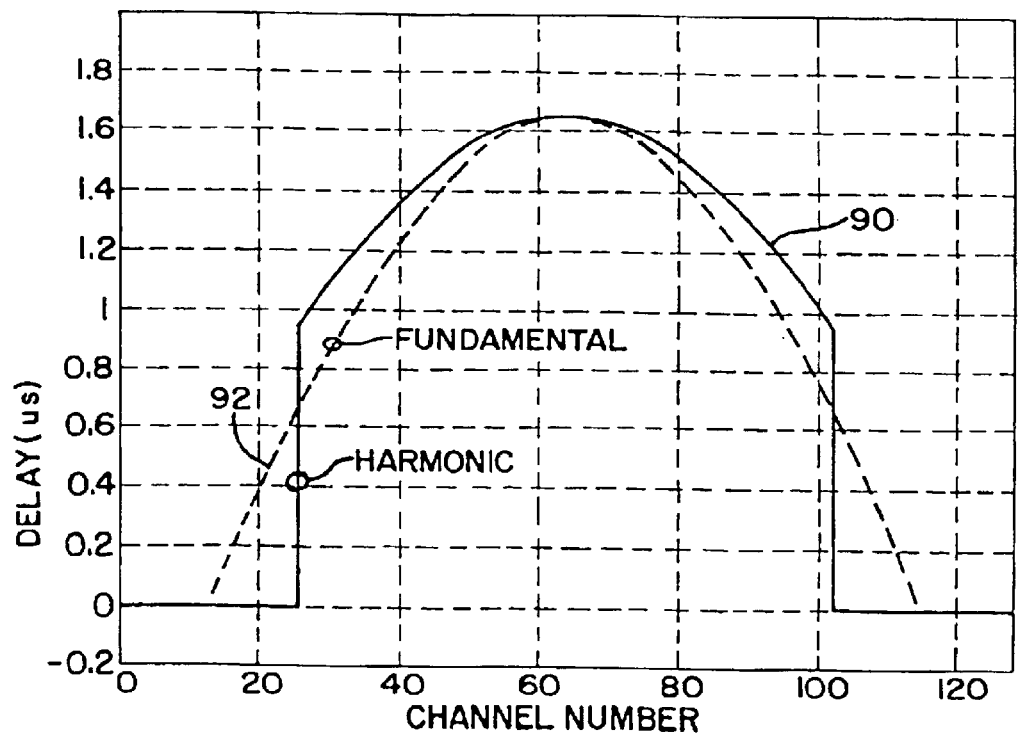

As shown in the example of FIG. 6D, a different focal depth or region associated with the harmonic waveform 88 for each channel relative to the fundamental waveform 84 for each channel is set using different delay profiles 90 (harmonic) and 92 (fundamental). The harmonic beam associated with the delay profile 90 has a narrower aperture width than the fundamental beam associated with the delay profile 92. FIG. 6A shows the same apodization profiles 94 (harmonic) and 96 (fundamental) but different aperture widths. FIG. 6B demonstrates different apodization profiles 98 (harmonic) and 100 (fundamental) with different aperture widths. FIG. 6C demonstrates the same delay profiles 102 (harmonic) and 104 (fundamental) with different aperture widths. Other apodization, delay, aperture widths and combinations thereof may be used. By application of different apodization, aperture widths and/or delay profiles to the fundamental and harmonic components across the channels, the span in range over which the second harmonic suppression occurs is optimized.

To create different apodization, aperture widths or delay profiles, different transmit waveforms with different characteristics, such as amplitude, delay, phase and center frequency, associated with the harmonic beam relative to the fundamental beam are used for each channel. For example, the amount of delay or amplitude associated with the fundamental waveforms 84 varies by channel independently of the amount of delay or amplitude associated with the harmonic waveforms 88. The amplitude and delay of the harmonic is set relative to the fundamental differently for different channels. In the example shown in FIG. 6B, the amplitude of the harmonic waveform 88 relative (the difference) to the fundamental waveform 84 at channel 20 is approximately 1.0. The approximate relative difference at channel 60 is 0.6. This per channel difference, in part, leads to improved suppression of the harmonic sidelobes. In the example shown in FIG. 6D, the delay of the harmonic waveform relative (the difference) to the fundamental waveform 84 at channel 20 is approximately 0.4, but the relative difference at channel 60 is approximately 0.0. Further improvements are possible by varying the phases, center frequencies, and bandwidths of the harmonic component relative to the fundamental component of the transmitted waveform across the transmit aperture.

As discussed above, the pre-distorted waveform may be generated as one waveform for each channel. To apply pre-distortion in the alternative embodiment demonstrated in U.S. application Ser. No. 08/893,150 discussed above, the pre-distortion component of the transmit waveform is incorporated into and stored as part of the digital transmit waveform. Since this architecture may not provide for independent apodization profiles for the fundamental and pre-distortion components of the transmit waveform, rectangular apodizations are preferably used. Based on the relationship discussed below, the rectangular apodizations for both components are the same, allowing a common waveform for all channels in the aperture. Alternatively, separate waveforms are provided for each channel or for groups of channels. The waveform transmitted at any given channel is selected as a function of amplitude. Preferably, the waveforms generated account for any subsequently applied apodization, such as by the amplifier 49 (see FIG. 1).

Additional implementations for adding the pre-distortion component to the fundamental component of a transmit waveform may be used. For example, a second, lower-power transmitter circuit may be placed in parallel with the primary transmitter for the purpose of transmitting the pre-distortion component as the primary transmitter transmits the fundamental component.

As another method to optimize the suppression of a harmonic band, such as the second order harmonic band, at the region of interest and along the path of propagation, the characteristics of the harmonic waveform 88 are adjusted. While all four characteristics listed above and other characteristics may be varied, the center frequency and the bandwidth values are preferably developed by modeling. Preferably, the amplitude and phase are varied. Additionally, the characteristics could be varied for each transmit waveform or each channel separately. Through experimentation, the optimized characteristics of the harmonic band waveform 88 are determined, such as minimizing the harmonic component along the beam axis, throughout the beam main lobe or in the sidelobes. By adjusting the phase of the harmonic band waveform 88 relative to the phase of the fundamental band waveform 84, the phasing relationship discussed above regarding the zero-crossings changes. Generally, the positive peak is less and the negative peak is more than half the distance between the zero crossings corresponding to each peak in a spatial representation of the waveform.

As an alternative or in addition to the optimization discussed above, an adaptive scheme is provided. By adaptation, the degree of non-linearity among the various tissues of interest as well as among a population of subjects is accounted for. For example, for contrast agent imaging, the system 10 (FIG. 1) is placed in a "learn mode". The controller 29 provides data controlling characteristics of the pre-distorted waveform. For example, the amplitude and phase of the harmonic band waveform 88 relative the fundamental band waveform 84 (FIG. 5E) is controlled. A plurality of pre-distorted or non-distorted test waveforms are generated with different characteristics. Based on information from the signal processor 24, the controller 29 determines the pre-distorted waveforms corresponding to the least B-mode image brightness for the desired harmonic imaging band at the region of interest. The system 10 is returned to a normal harmonic imaging mode for introduction of contrast agents or tissue harmonic imaging using the selected pre-distorted waveforms. Other characteristics may be used for adaptation. The characteristics of the waveforms may be controlled as a function of various system parameters, such as transmit voltage, transmit frequency, focus depth, transmit apodization, and transmit bandwidth. For example, the system controller 29 determines the characteristics based on the system parameters.

The non-linear characteristics of the transmit channel may be accounted for separately from the propagation non-linear characteristics. For example, the system 10 transmits the test waveform or waveforms. The system 10 adaptively adjusts the phase and amplitude of the pre-distortion component to eliminate any second harmonic content from echoes received from the first few mm of an insonified body. By using echoes from the first few mm, little or no second harmonic information is generated through non-linear propagation. In a variation of this approach, second harmonic levels are measured from the reflection off a dry, unloaded lens face of the transducer 16 relative to the fundamental component. Other measurements, including different ranges, may be used.

In another method for accounting for transmit channel non-linear characteristics, pre-distortion parameters associated with the transducer or other components in the transmit channel are stored. In one embodiment, the non-linear characteristics of each transducer 16 or each transducer 16 and the likely transmit channel are measured at the factory and stored in non-volatile memory in the transducer 16. The system 10 reads the characteristics and applies the appropriate pre-distortion waveform. If variations from transducer to transducer are small, the non-linear characteristics of the transducer type or transducer type and likely transmit channel are measured at the factory and the parameters of the pre-distortion component waveform are stored in the operating software of the system 10.

Alternatively to the methods discussed above, some or all of the characteristics of the pre-distorted waveform are placed under user control. For example, an input, such as a knob, is provided for each of the amplitude of the harmonic band waveform 88 and phase of the harmonic waveform 88 relative to the fundamental band waveform 84. Other characteristics and more or fewer characteristics may be placed under user control. The user adjusts the controls to achieve the darkest image or the least image brightness at the depth of interest corresponding to a region or regions of interest along each ultrasound transmit line. The selected pre-distorted waveform is then used for normal harmonic imaging. The user may additionally switch between one or a plurality of focal regions of interest along any ultrasound line. Using a plurality of focal regions and corresponding regions of interest, the suppression of harmonics due to tissue propagation is more efficient at many regions along the ultrasound transmit line. The amplitude of the harmonic energies along the relevant portions of the ultrasound transmit line for plurality of firing is less than the amplitude associated with one firing.

The methods discussed above may be used with various other transmission schemes, including multiple pulse cancellation techniques. Multiple pulse cancellation techniques are discussed in U.S. application Ser. No. 09/061,083, filed herewith on Apr. 15, 1998 for an Ultrasonic Imaging Method With Multiple Pulse Cancellation, the disclosure of which is herein incorporated by reference. Examples of multiple pulse cancellation techniques are also disclosed in Hwang U.S. Pat. No. 5,706,819 and Chapman U.S. Pat. No. 5,632,277. Additive inverse techniques for selectively removing fundamental components of an ultrasonic image are disclosed. In the disclosed methods, two or more ultrasonic pulses are transmitted into a subject along the same beam direction, including first and second pulses of opposite polarity. The echo signals associated with the first and second pulses are summed, thereby causing linear components to cancel to a greater extent than non-linear components. For example, fundamental frequency components of the echo signal associated with linear propagation and scattering are selectively canceled, and second harmonic components of the echo signal due to non-linearities are enhanced.

Pre-distorting each of the two pulses used for additive inverse techniques is graphically demonstrated in FIGS. 8 and 9. FIGS. 8A and 9A represent the first and second pulses before pre-distortion at 300 (dotted line) and after pre-distortion at 302, respectively. The first and second pulses 300 are the same waveform out of phase by 180 degrees. FIGS. 8B and 9B represent the spectra associated with the pre-distorted pulses 302. The spectra associated with each pulse 302 show magnitude and not phase, so are similar. FIGS. 8C and 9C represent the fundamental component 300 and second harmonic component 304 (dashed line) of each pre-distorted pulse 302 (see FIGS. 8A and 9A). The fundamental components 300 are 180 degrees out of phase and the second harmonic components 304 are in phase for one pulse compared to another. FIGS. 8D and 9D represent the spectra associated with the fundamental and harmonic components 300 and 304. FIGS. 8 and 9 represent pre-distortion for propagation non-linear characteristics. Similar or different distortion and resulting pre-distortion may exist for transmit channel non-linear characteristics.

Figure 10:
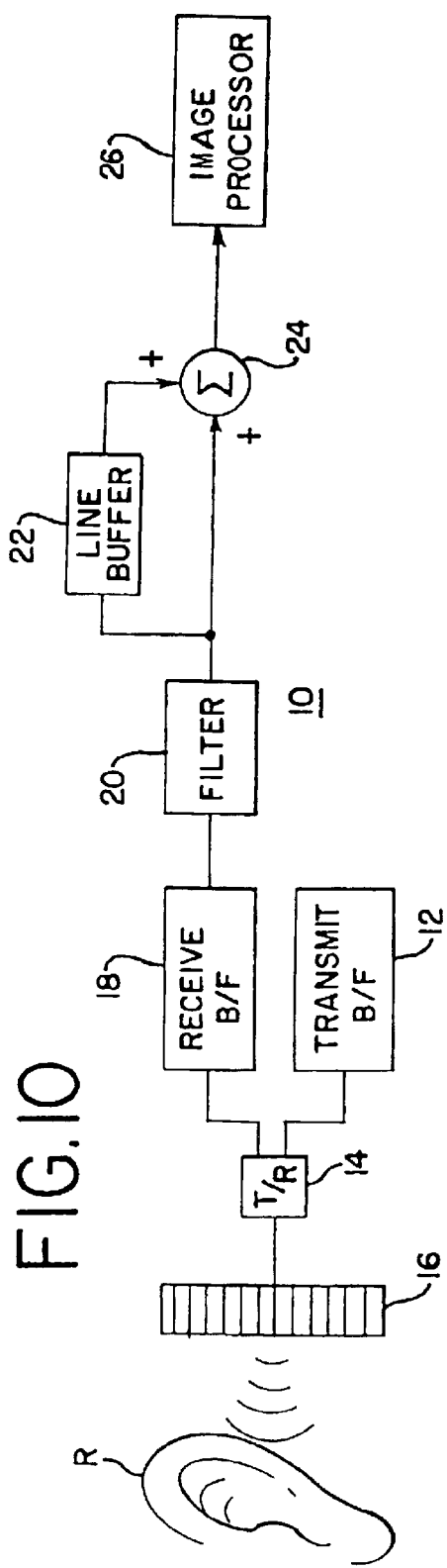
FIG. 10 is a block diagram of an ultrasonic imaging system suitable for use with this invention.

FIG. 10 shows an ultrasonic imaging system 10 suitable for use with multiple pulse cancellation. The system 10 includes a conventional ultrasound transmit beamformer 12. The transmit beamformer 12 supplies transmit pulses that are applied via a transmit/receive switch 14 to a multi-element transducer array 16. The transducer array 16 transmits ultrasound pulses into a region R of an imaging subject.

The reflected ultrasound pulses from the region R are received by the transducer array 16 and applied to a conventional ultrasound receive beamformer 18 via the transmit/receive switch 14. The receive beamformer 18 supplies as an output an analytic (pre-detection) signal, preferably via a filter 20, to a line buffer 22 that is coupled to a summer 24. The filter 20 is not required in all embodiments, but in this embodiment is provided to remove most of the fundamental component of the receive signal. By means of the line buffer 22 and the summer 24, two successive ultrasound lines are added together or subtracted. The output of the summer 24 is sent to an image processor 26 for further processing, such as signal detection and display to the user.

The various components of the system 10 can take any suitable form. For example, the beamformers 12, 18 can be either analog or digital beamformers. In general, the widest variety of alternatives can be used, including those described in U.S. Patent application Ser. No. 09/061,082.

Figure 11A:
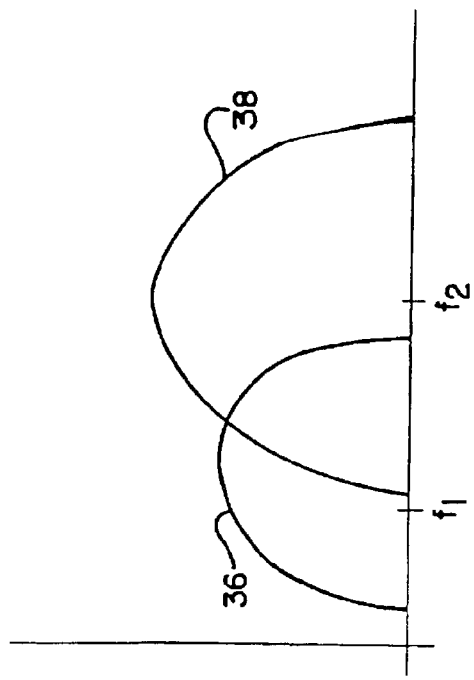
FIGS. 11a and 11b are frequency-amplitude diagrams illustrating operation of the system of FIG. 10.
Figure 11B:
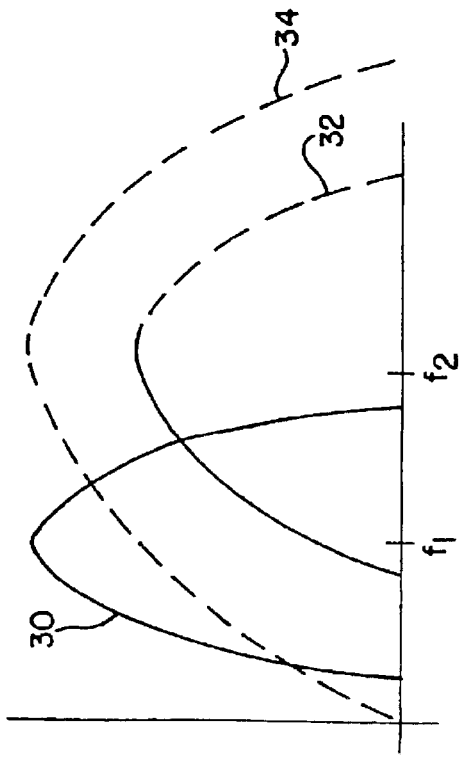

The system 10 in this embodiment is operated in a two pass pattern. First, an ultrasound transmit pulse is directed into the region R along a first beam direction at a known reference phase. FIG. 11a illustrates the spectrum of the reflected ultrasonic pulse as output by the receive beamformer 18. This spectrum includes two components: a fundamental component 30 at or about the fundamental transmitted frequency f1 (arising from linear scattering and propagation), and a harmonic component 32 at or about frequency f2 (approximately twice f1), arising from second harmonic non-linear scattering or propagation. The response of the filter 20 is shown at 34 in FIG. 11a. This response is preferably centered about the harmonic frequency, and is used to reduce fundamental signal components. The frequency spectrum of the output of the filter 20 is shown in FIG. 11b. Here, the level of the fundamental component 36 has been reduced as compared to the level of the harmonic component 38.

The filter 20 may be omitted entirely with acceptable results. The multiple pulse approach described in this specification allows broader band transmit pulses and receive filters to be used than could be used in a conventional harmonic imaging system, resulting in greater overall imaging bandwidth and hence improved axial resolution.

The output of the filter 20 is stored in the line buffer 22 on the first pass. On the second pass, the same ultrasound line is fired, but with a phase shift of pi radians or 180 degrees with respect to the first pulse. The second pass ultrasound data is then added to the first pass ultrasound data stored in the line buffer 22.

Components of the received ultrasound data arising due to linear propagation and scattering are inverted in polarity as a result of the polarity inversion of the transmit pulses. Thus, any linear components in the received ultrasound data cancel after summing. This is illustrated in FIG. 12a, where the fundamental components 40, 42 of the first and second transmit pulses have a sum 44 that is low in amplitude.

A different result is obtained for components of the received ultrasound data arising as even harmonics from non-linear scattering or propagation. These components will have the same phase in both the first pass received ultrasound data and the second pass received ultrasound data and will thus survive the summing operation by constructive interference. This is illustrated in FIG. 12b, where the harmonic components 46, 48 of the first and second transmit pulses create a sum 50 with a relatively large amplitude.

In general, shifting the phase of the transmit pulses by phi shifts the phase of any first harmonic (fundamental) components of the received ultrasound data by the same phase shift phi, but shifts the phase of any second harmonic components of the received ultrasonic data by 2*phi. Any third harmonic components experience a 3*phi phase shift, and so on. Thus, if a phase shift of pi radians is applied between the two transmit pulses as described above, all even harmonic components of the received ultrasound data will experience a phase shift of 2*pi*n radians and will be reinforced by summing, while all odd harmonic components will experience a phase shift of 2*pi*n+pi radians, and will be canceled by the summing operation.

Alternately, the second pass ultrasonic data can be subtracted instead of added from the first pass ultrasonic data. With this approach even harmonic components are canceled and odd harmonic components including the fundamental component are reinforced by the summing operation.

The two pulse summing approach described above provides greater rejection of either the fundamental or the even harmonic components than can be obtained by conventional beamformer using conventional filters. In particular, the two pulse approach can separate the echo signal from non-linear scatterers (even harmonic generators) at one frequency from the echo signal from linear scatterers at the same frequency. This is particularly useful when the transmit pulse contains significant energy in the harmonic band.

Instead of transmitting a pure modulated sinusoid, alternate transmit waveforms may be used. Instead of transmitting two waveforms differing by a pi radian phase shift as described above, one can transmit waveforms Y(t) and −Y(t). This is similar to a pi radian phase shift for all of the frequency components comprising the pulse. In an alternate method of construction, a gated or modulated square wave may be used in place of the gated or modulated sinusoid.

In general, the transmitted ultrasound pulses may comprise components X(t) and Y(t), summed together. For example, a transmit beamformer as shown in FIG. 13 can be used. This transmit beamformer is capable of forming a transmit pulse containing two spectral components. The first is generated by the transmit beamformer 52 and the second spectrum component is generated by the transmit beamformer 54. These two spectral components are summed by the summer 56 before they are applied to the transducer array.

In general, if the two transmitted pulses take the form X(t)+Y(t) and X(t)−Y(t), then the summed receive signal from the summer 24 of FIG. 10 includes three components:

1. ultrasound signals resulting from the linear scattering of X(t),
2. ultrasound signals resulting from even harmonic non-linear scattering of X(t), and
3. ultrasound signals resulting from even harmonic non-linear scattering of Y(t).

Ultrasound signals resulting from linear scattering of Y(t) are canceled in the summing operation.

In one embodiment, transmit pulses are viewed as the sum of an unmodulated baseband component and a modulated bandpass component which has the desired spectral properties and phase for imaging and fundamental cancellation.

For example, unipolar transmit pulses may be formed by combining an unmodulated signal x(t) with a modulated signal y(t) as follows:

$$p1(t)=x(t)+y(t),$$

$$p2(t)=x(t)-y(t),$$

where $x(t) >= |y(t)|$, so that $x(t)+y(t) > 0$ and $x(t)-y(t) >= 0$. For example, if y(t) is represented as $$y(t)=e(t)*\cos(2pi*f*t)$$

and x(t) is selected to be e(t), the above conditions for unipolar pulses are satisfied.

Both pulses contain a strong fundamental spectral component but with opposite (180 degree) fundamental carrier phase. The transmitted pulses will stimulate second harmonic generation with second harmonics of the same phase, since the second harmonic carrier phase rotates at twice the rate of the fundamental, or 360 degrees.

Thus, when the return echo signals from sequential pulse firings are added, the components due to x(t) add to form a 2x(t) echo, and the components due to the fundamental carrier cancel since they are out-of-phase. The second harmonic echo components are in-phase, so they are enhanced by a factor of two after addition. The later is the desired echo signal in harmonic imaging.

The echo from the baseband component 2x(t) is generally an unwanted component, but it can be made very small by choosing the shape of x(t) such that its spectral energy in the second harmonic region is insignificant.

In a second embodiment, transmit pulses can be formed with "pre-distortion" terms in the following manner:

$$p1(t)=a1(t)*\cos(4pi*f*t+phi1(t))+e(t)*\cos(2pi*f*t);$$

$$p2(t)=a2(t)*\cos(4pi*f*t+phi2(t))-e(t)*\cos(2pi*f*t).$$

The second harmonic components at 2xf can be designed to cancel non-linear distortion produced in the generation of the acoustic pulse (e.g. due to transmitter circuit or non-linear transducer effects) or can be set to cancel tissue harmonic distortion generated at a given range for the purpose of enhancing contrast with non-linear scattering agents.

The two pre-distortion envelopes a1(t) and a2(t) and the two phases phi1(t) and phi2(t) will in general be similar, but may differ slightly due to the need to cancel particular non-linear distortion generating mechanisms. The envelopes a1(t) and a2(t) will typically be much smaller (e.g. factor of ten or smaller) than the fundamental envelope e(t).

Techniques and uses involving pre-distortion are the subject of associated U.S. patent applications Ser. No. 08/911,973 and Ser. No. 09/061,014, which are hereby incorporated by reference.

Features of the above two embodiments described above can be combined in a third embodiment where unipolar transmit pulses are constructed in the following manner:

$$p1(t)=x(t)+a1(t)*\cos(4pi*f*t+phi1(t))+e(t)*\cos(2pi*f*t).$$

$$p2(t)=x(t)+a2(t)*\cos(4pi*f*t+phi2(t))-e(t)*\cos(2pi*f*t).$$

These transmit pulses have the form $$p1(t)=x(t)+y1(t),$$

$$p2(t)=x(t)-y2(t),$$

where the functions y1(t) and y2(t) are the pre-distorted modulated pules defined in the second embodiment above. Note that except for the small pre-distortion terms, this form is very similar to that of the introductory discussion:

$$p1(t)=X1(t)+Y(t),$$

$$p2(t)=X2(t)-Y(t),$$

where $$X1(t)=x(t)+a1(t)*\cos(4pi*f*t+phi1(t))$$

$$X2(t)=x(t)+a2(t)*\cos(4pi*f*t+phi2(t))$$

$$Y(t)=e(t)*\cos(2pi*f*t).$$

Since a1(t) and a2(t) are much smaller than e(t), we have $$X1(t)\sim=X2(t).$$

Figure 14:
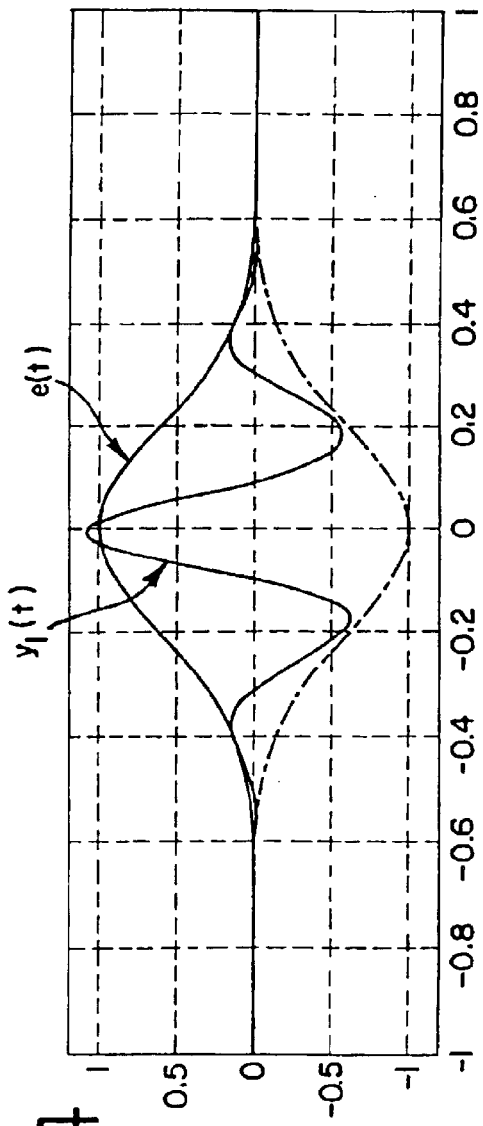
FIGS. 14 and 15 are waveform diagrams of fundamental components of two transmit pulses.
Figure 15:
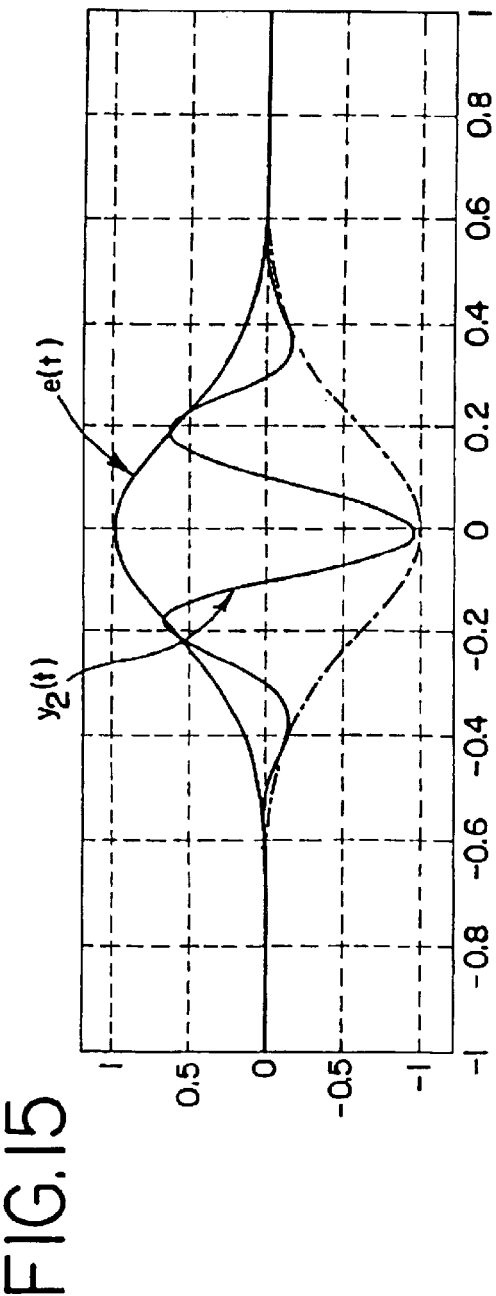
Figure 16:
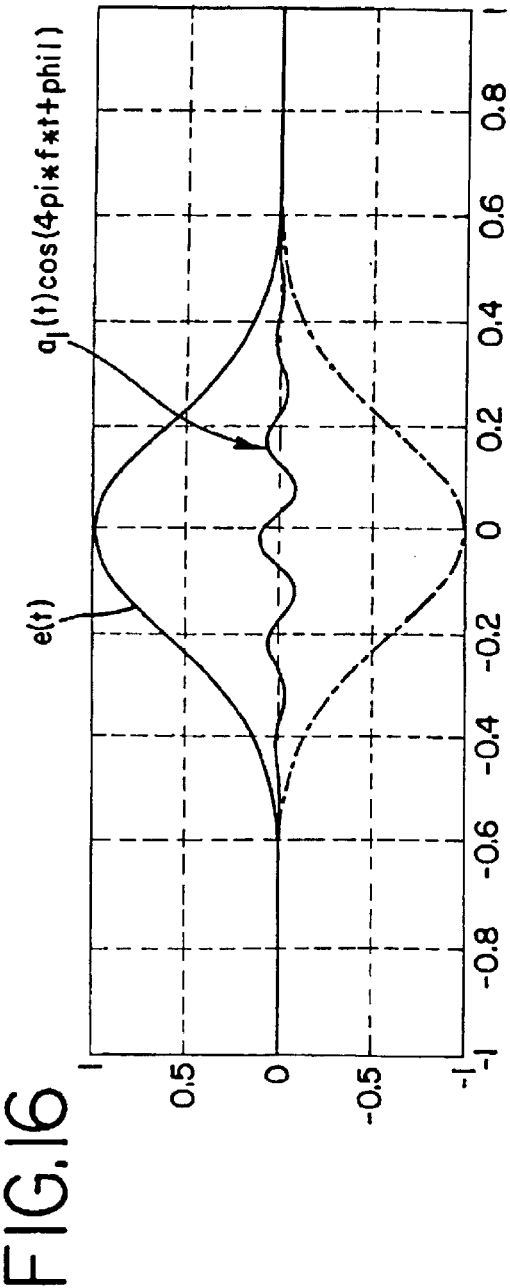
FIGS. 16 and 17 are waveform diagrams of harmonic components of two transmit pulses.
Figure 17:
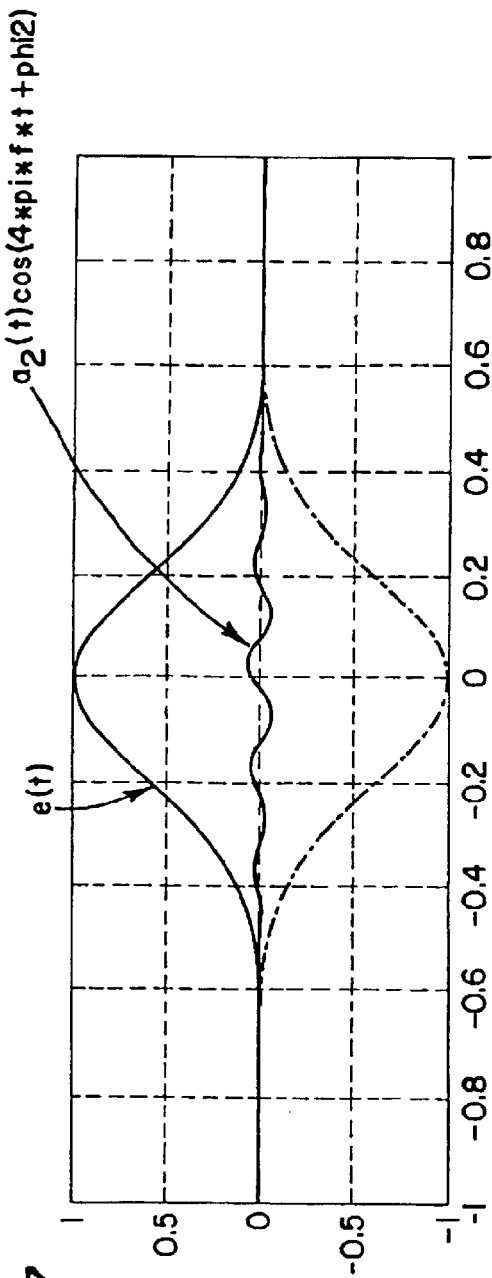

Illustrations of the modulated bandpass components y1 and y2 are given in FIGS. 14 and 15. The second harmonic terms are shown separately in FIGS. 16 and 17.

In order to produce a unipolar modulated waveform, an unmodulated unipolar function x(t) is added such that x(t)+y1(t)>=0 and x(t)+y2(t)>=0.

The transmit pulses p1(t) and p2(t) will be unipolar if x(t)≧|y(t)| and x(t)>=|y2(t)|.

In one preferred embodiment, x(t) is chosen to be of the form x(t)=x(t)+e(t), where x(t) is a suitable baseband offset signal. The offset signal x(t) may be chosen to vanish to zero outside an interval containing the active region of the pulse, thus providing a suitable amount of offset bias in order to keep a unipolar transmitter circuit biased in its linear low-distortion region during the active transmit pulse. The envelope and offset function will usually be chosen so that the spectrum of the baseband function x(1) will be very low (insignificant) in the desired second harmonic receive band. The offset function and transmit pulse are preferably zero outside of an interval containing the active pulse in order to shut off the transmitter for maximum power efficiency.

Figure 18:
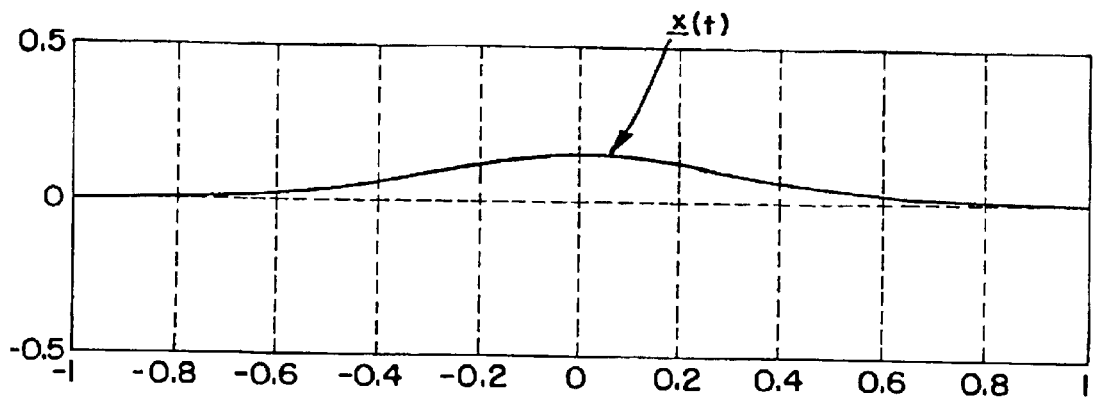
FIG. 18 is a waveform diagram of a baseband component of a transmit pulse.
Figure 19:
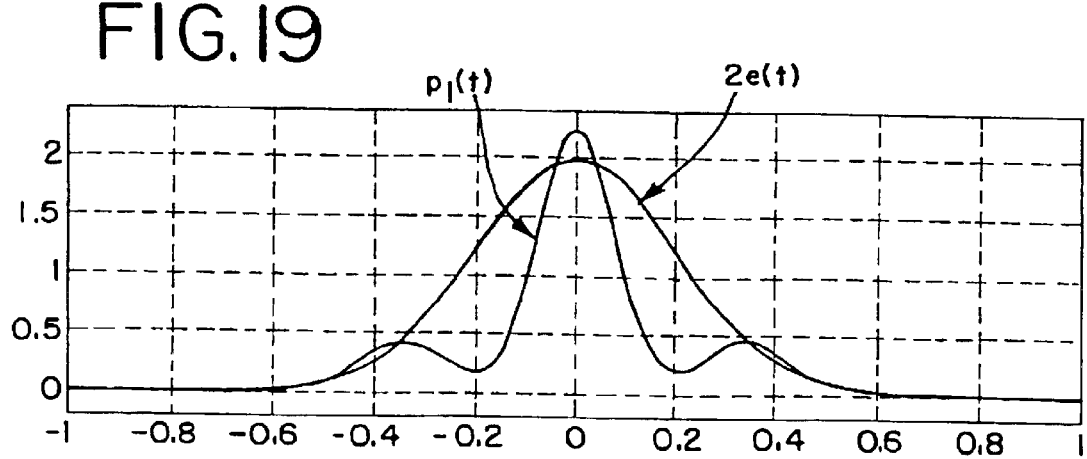
FIGS. 19 and 20 are waveform diagrams of two unipolar transmit pulses.
Figure 20:
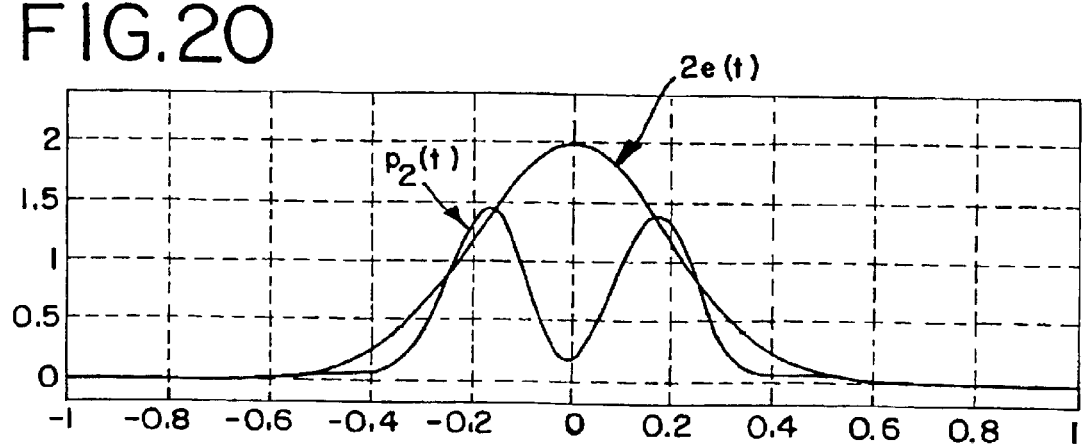

Since a1(t) and a2(t) are relatively small, this condition can be ensured if for example we choose x(t)>=2*max(|a1(t)|, |a2(t)|). Usually, x(t) will be a Gaussian-like window function similar to e(t). However, the shape and spectral contribution of x(t) is not quite as critical, since it will typically be much smaller than e(t). An illustration of x(t) is given in FIG. 18. Illustrations of typical resulting unipolar pulses p1(t)=x(t)+y1(t) and p2(t)=x(t)-y2(t) are given in FIGS. 19 and 20.

Figure 21:
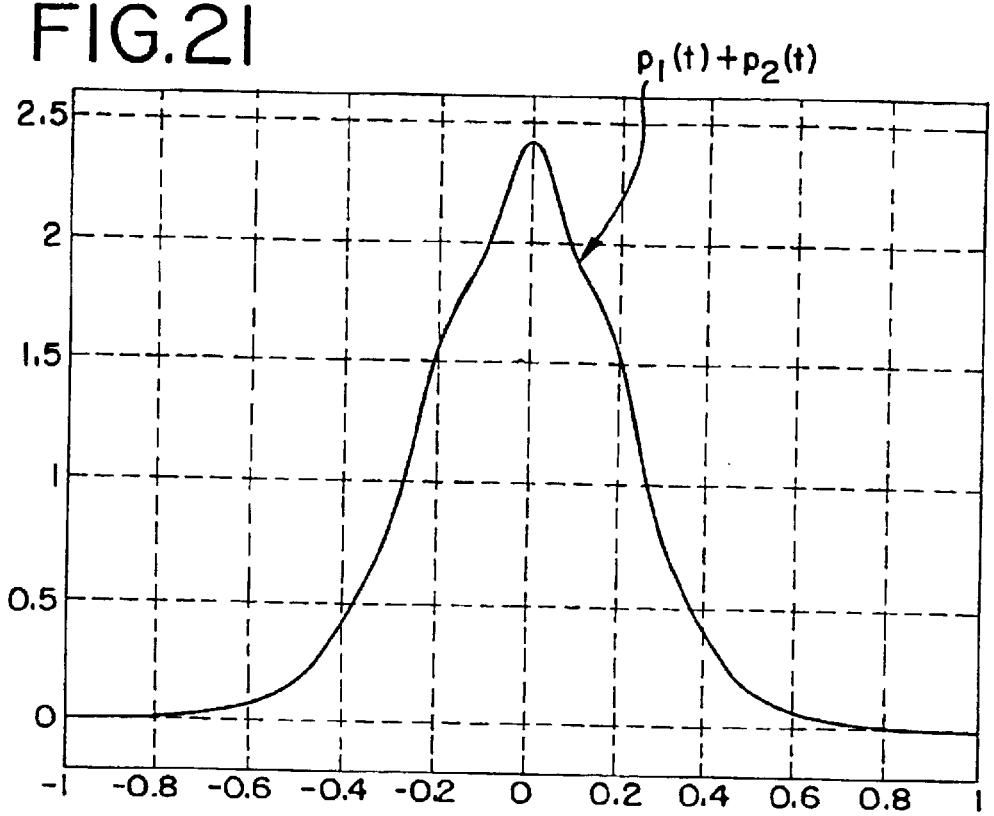
FIG. 21 is a waveform diagram of a combined receive signal.

The sum of p1 and p2 is illustrated in FIG. 21 and is approximately equal to 2*x(t) except for the small residual signals containing the second harmonic pre-distortion terms which do not sum to zero.

Figure 22:
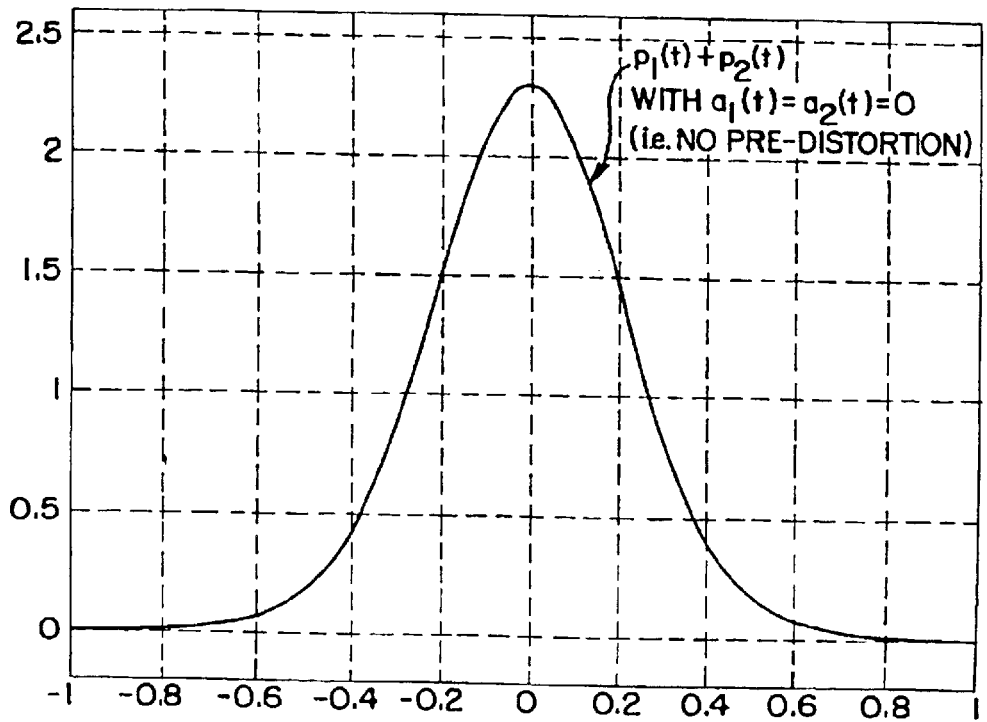
FIG. 22 is a waveform diagram of another combined receive signal.

FIG. 22 shows the sum of p1 and p2 for the special case a1(t)=a2(t)=0, where there are no pre-distortion terms.

Figure 23:
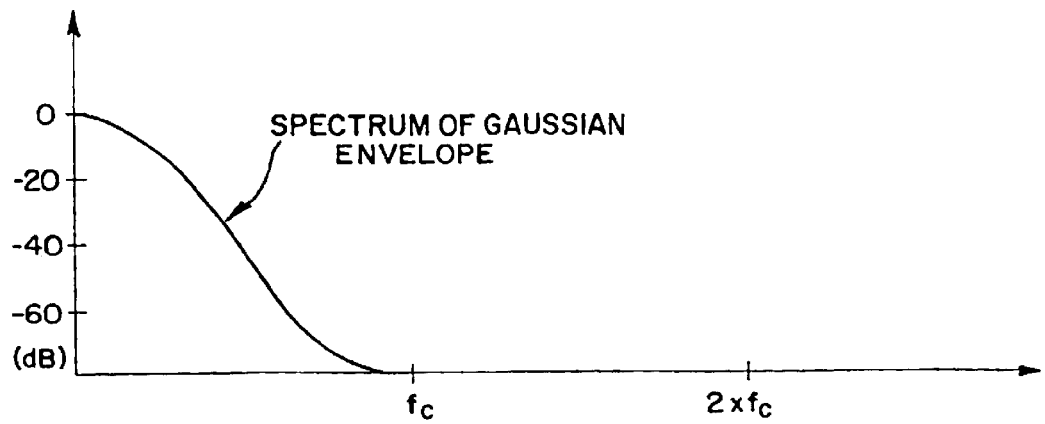
FIGS. 23 and 24 are frequency-amplitude diagrams of a Gaussian envelopes and a unipolar pulse, respectively.
Figure 24:
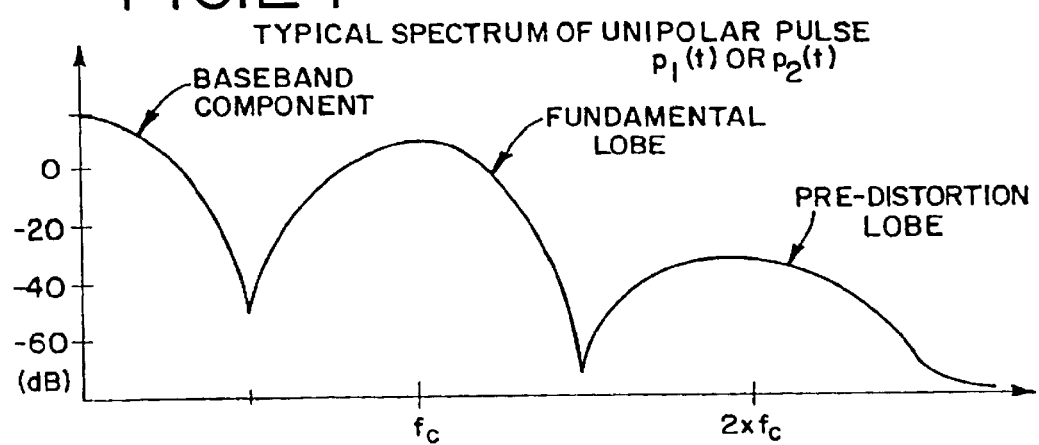

In this case, if low sidelobe envelope shapes are chosen for e(t) and x(t), the energy in the spectra of p1(t) and p2(t) around the second harmonic can be made very small. FIG. 23 illustrates the baseband spectrum of a Gaussian envelope, e(t). If x(t) is similarly a Gaussian shape, the spectra of p1(t) and p2(t) will be similar to that illustrated by FIG. 24.

Thus, for the continuous waveforms of this example, phase complementary unipolar pulses p1(t) and p2(t) are constructed which independently have controlled second harmonic distortion and when summed have very small spectral energy in the fundamental and second harmonic imaging bands. The waveforms also have the other desired properties of incorporating useful pre-distortion cancellation functions and a linearizing baseline offset function.

Next, the technique will be illustrated with respect to a discrete time and magnitude form which is appropriate in practical digitally controlled transmitter implementations.

To better understand the preferred quantized construction technique, it is useful to rewrite the expressions for p1(t) and p2(t) in the following form:

$$p1(t)=\underline{x}(t)+e(t)(1+*\cos(2pi*f*t))+a1(t)*\cos(4pi*f*t+phi1(t))>=0,$$

$$p2(t)=\underline{x}(t)+e(t)(1-\cos(2pi*f*t))+a2(t)*\cos(4pi*f*t+phi2(t))>=0,$$

where a1(t) and a2(t) are the pre-distortion envelopes for p1 and p2, respectively. If no pre-distortion is required in an application, a1(t) and a2(t) can be set zero. The sum of p1 and p2 will be 2x(t)+2e(t)=2x(t), as before.

The terms (1+/-cos(2pi*f*t)) are offset carriers which are unipolar.

The baseband offset signal x(t), modulation envelope e(t), offset carriers, and predistortion terms will be typically quantized into samples at an interval which is a fractional power of two of the fundamental period, T=1/f. (e.g. T/4 or T/8). The three components can be quantized at different powers of two and then summed to form a composite pulse train which is in turn represented with samples at the largest power of two, e.g. T/4 or T/8.

In order that the phase rotation information of the pre-distortion harmonic terms, phi1 and phi2, be represented arbitrarily and unambiguously, the sample period is preferably T/8 or smaller. If phi1 and phi2 are zero, good spectral properties can be obtained as in the example below with p1 and p2 sampled with a period of T/4 or larger.

Waveforms that are discrete in time and amplitude can be determined apriori for a given transmitter channel and then generated by the transmit pulse from waveform data read out of a small memory into a digital to analog converter. Transmitter and waveform generation techniques are similar to those described in U.S. patent application Ser. No. 08/893,150, which is hereby incorporated by reference.

Figure 25:
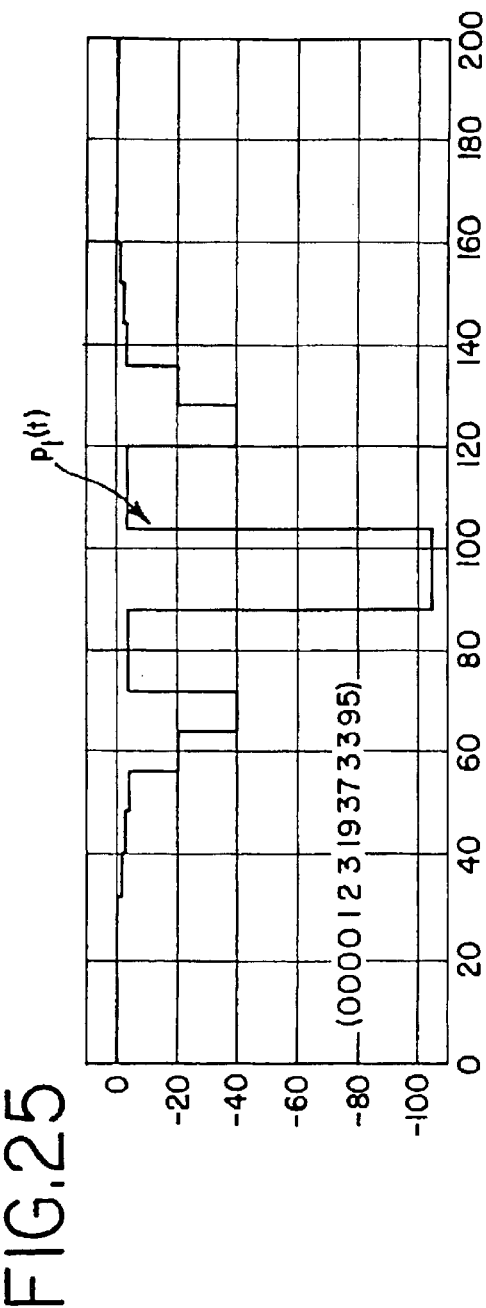
FIGS. 25 and 26 are a waveform diagram and a frequency spectrum, respectively, of a transmit pulse p1(t) of a first polarity.
Figure 26:
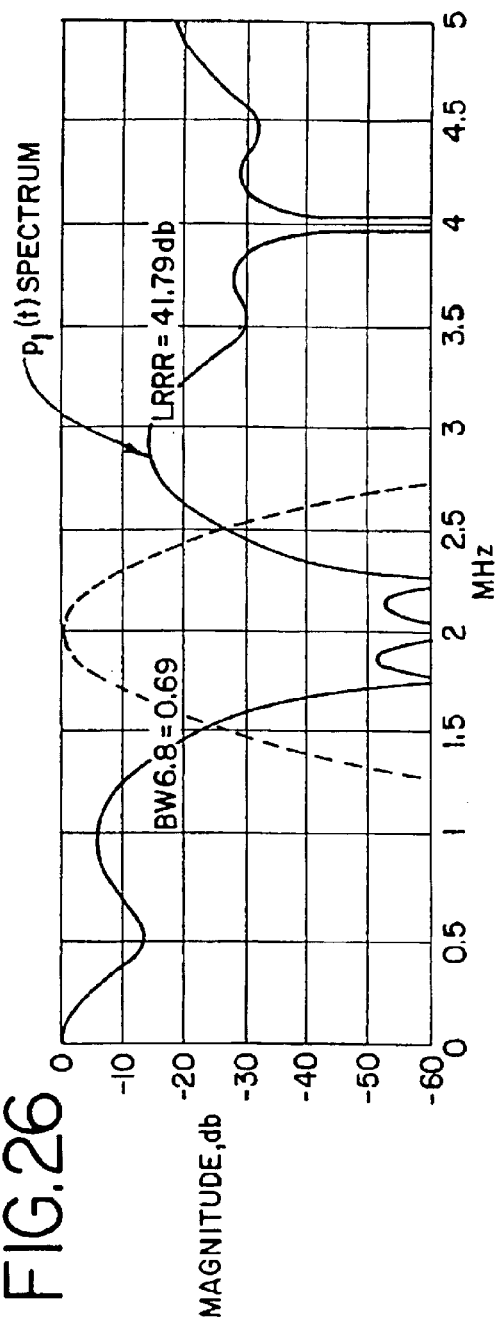
Figure 27:
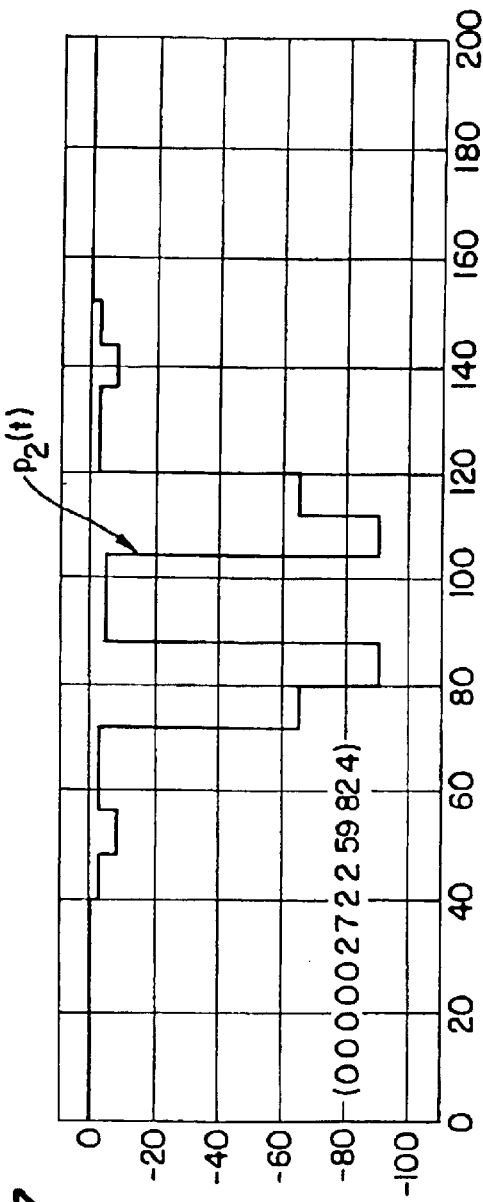
FIGS. 27 and 28 are a waveform diagram and a frequency spectrum, respectively, of a second transmit pulse p2(t) of a second polarity.
Figure 28:
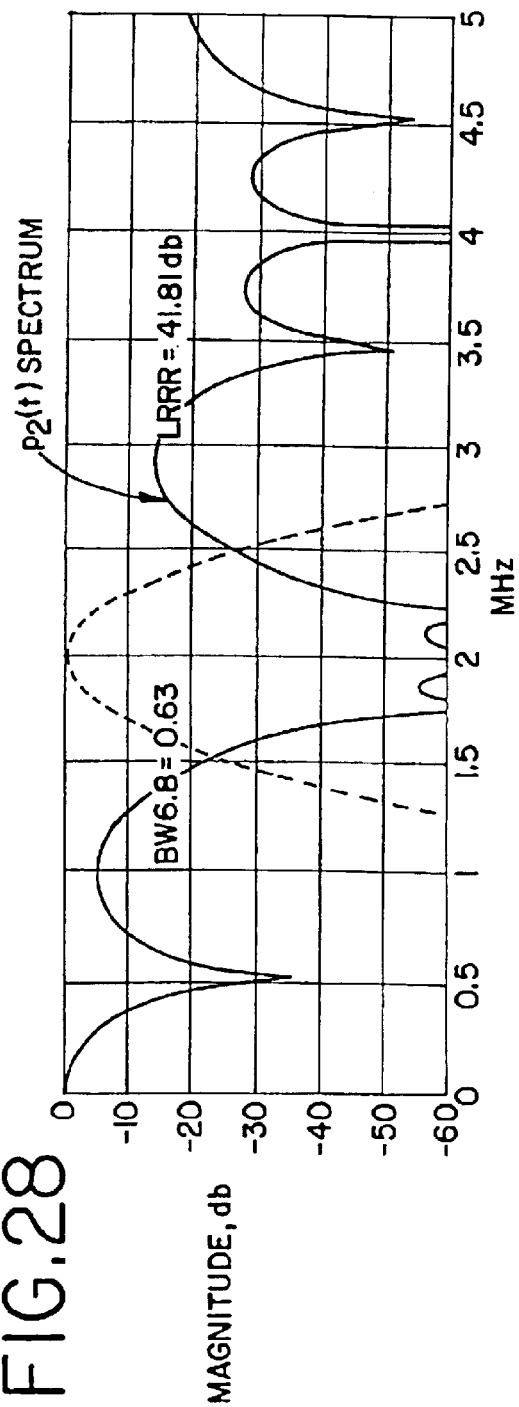

Exemplary discrete pulse waveforms for p1 and p2 are shown in FIGS. 25 and 27 along with their spectra in the frequency domain (FIGS. 26 and 28). These unipolar waveforms have complementary carrier phase and are quantized in amplitude to 96 levels (from 0 to 95 peak). The illustrated waveforms have a baseline offset function and are designed to have relatively wide fundamental mainlobe bandwidths and relatively low spectral energy in the second harmonic region. The pre-distortion terms are zero in these examples.

The waveforms of FIGS. 25 and 27 use a square wave offset carrier which is equivalent to T/2 sampling of the carrier component. An offset square wave carrier has slightly higher spectral energy at the fundamental than a more finely sampled offset carrier. The envelope function and baseline offset functions are discrete Guassian approximations which are sampled at T/4.

Figure 29:
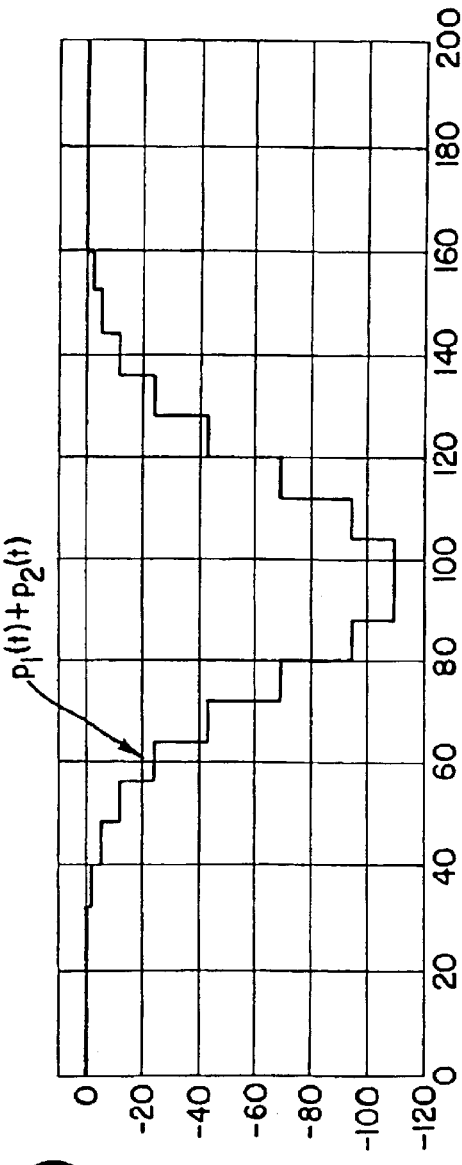
FIGS. 29 and 30 are a waveform diagram and a frequency spectrum, respectively, of a combined signal equal to the sum of p1(t) and p2(t).
Figure 30:
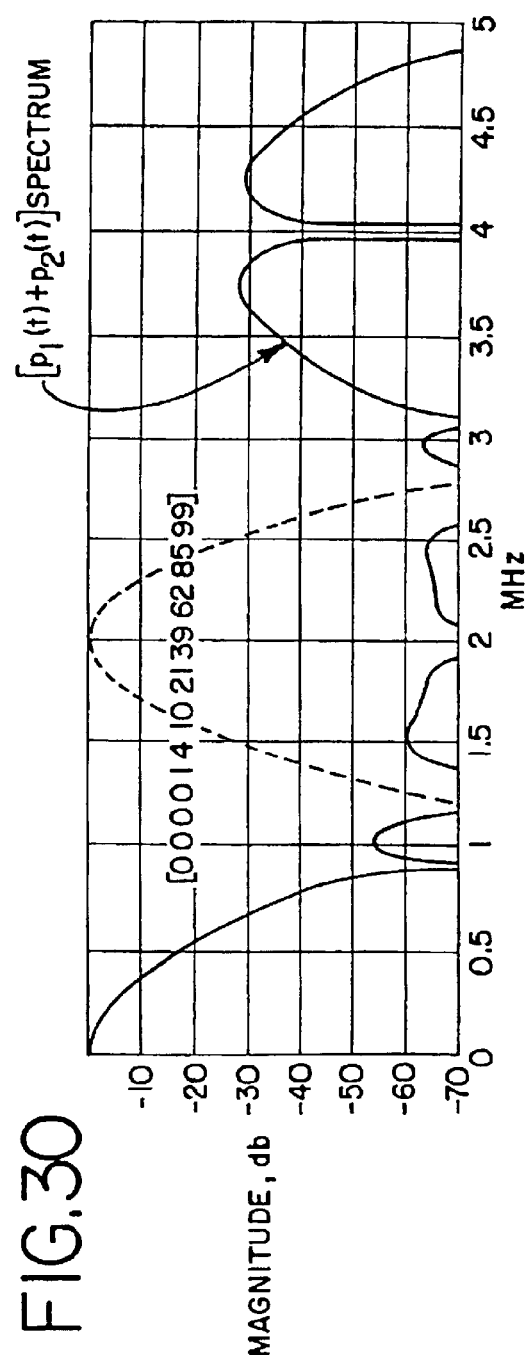

The sum of p1 and p2 and the corresponding spectrum are shown in FIGS. 29 and 30. Note that the sum is essentially a sampled Gaussian envelope with very low sidelobes in the region of the fundamental and the second harmonic. This is the desired characteristic for two-pulse harmonic imaging, since the linear echo terms cancel.

It should be noted from these examples that a proportionally larger baseband offset function results in a proportionally smaller peak-to-peak excursion of the modulated component of the signal, and thus less efficiency for given peak level. In a unipolar transmitter design which maximizes efficiency, it is desirable to choose the baseband offset component as small as possible while still providing adequate linearity in the transmitter to achieve distortion goals.

When pre-distortion waveforms are incorporated in the sampled pulse train, it is desirable to use a finer sampling interval of at least T/8 so that the phase components of the pre-distortion terms are adequately represented. Samples at T/8 provide 4 samples per period of the second harmonic carrier.

Unipolar transmitter waveform generation and output scaling techniques are basically the same as those described in above-identified U.S. patent application Ser. No. 08/893,150, filed Jul. 15, 1997, which is incorporated by reference herein. For two-pulse imaging, the transmitter should be capable of alternating between the two waveform types, p1(t) and p2(t), on sequential line firings.

The ultrasonic imaging methods with multiple pulse cancellation described above can be summarized with the flow chart of FIG. 31. These methods include a first step 100 of transmitting a set of ultrasonic transmit pulses into a region. Consecutive ones of these transmit pulses are multiple component, one component of which is out of phase between the two transmit pulses to a greater extent than the other component. As explained above, these multi-component transmit pulses can be designed to be unipolar or to provide pre-distortion to reduce system and/or tissue nonlinearities.

In step 102 ultrasonic receive pulses are received from the region. In step 104 at least two of the receive pulses are summed with either like or opposite polarity to form a combined signal. Summing with like polarity causes the combined signal to emphasize harmonic components and to suppress fundamental components of the receive pulses. Conversely summing with opposite polarity results in a combined signal with enhanced fundamental components and suppressed harmonic components.

The two pulse imaging waveform techniques described above provide several advantages:

1. They allow sequential unipolar pulses of complementary phase to be fired such that the corresponding echoes when added will suppress the undesired fundamental echo component and the undesired echo component due to the transmitted second harmonic, and will enhance the desired second harmonic echo component generated by non-linear propagation or non-linear scattering.

2. They allow transmit pulses to be pre-distorted in order to cancel other non-linearities in the acoustic transmit signal generation path or non-linear components generated by pulse propagation to a target.

3. They allow a transmitter pulse bias signal (offset signal) to be applied for linearizing the transmitter driver in high efficiency on/off transmitters.

Many alternatives to the preferred embodiments described above are possible. For example, the two transmit pulses that contribute to the summed receive pulses may be either spatially aligned as taught by the above identified Hwang and Chapman patents or spatially distinct as described in co-pending U.S. Patent applications Ser. Nos. 08/993,533 and 08/993,395, which are hereby incorporated by reference.

The summing operations described above can include summing more than two ultrasound signals, and the summing may be either of like polarity to selectively suppress fundamental components or opposite polarity to selectively suppress second harmonic components. If desired, a weighted sum can be used.

As used herein, the term "set" is intended broadly to encompass two or more pulses.

As used herein, two components are said to be substantially in phase whenever their sum is greater than the larger of the two. Thus, two components can be substantially in phase even if they are not matched in phase.

The embodiments described above can be used with or without added contrast agent in both contrast and tissue harmonic imaging.

It should be understood that many changes and modifications can be made to the embodiments described above. For example, pre-distorted waveforms may be used for tissue or non-linear contrast agent harmonic imaging. Harmonic imaging based on any of various harmonic bands may be used. Pre-distorted rectangular or uni-polar waveforms may also be used. Many of the various processes discussed above may be analog or digital processes.

It is therefore intended that the foregoing detailed description be understood as an illustration of the presently preferred embodiments of the inventions, and not as a definition of the invention. It is only the following the claims including all equivalence that are intended to define the scope of the invention.

We claim:

1. In a method comprising the steps of (a) transmitting a plurality of waveforms from a transducer at a fundamental frequency and (b) receiving reflected ultrasonic energy at a harmonic of the fundamental frequency in an ultrasound system, an improvement wherein step (a) comprises the step of:

(a1) transmitting a waveform comprising a fundamental spectral component and a harmonic spectral component from a transducer, such that upon propagation in range along an ultrasound line, a spectral peak of said harmonic component at a second region is less than said spectral peak of said harmonic component at a first region by an amount that exceeds that attributable to only attenuation, wherein said second region is greater in range along said ultrasound line than said first region.

2. The method of claim 1 wherein step (a1) comprises pre-distorting said waveform as a function of a non-linear characteristic of a device.

3. The method of claim 2 wherein step (a1) comprises pre-distorting said at least one waveform as a function of a non-linear characteristic of the transducer.

4. The method of claim 2 wherein step (a1) comprises pre-distorting said at least one waveform as a function of a non-linear characteristic of a lens.

5. The method of claim 2 further comprising steps:

(c) transmitting at least one test waveform;

(d) receiving echoes associated with the test waveform; and (e) determining pre-distortion parameters in response to the echoes.

6. The method of claim 2 further comprising step (c) of storing pre-distortion parameters associated with the transducer.

7. The method of claim 1 wherein step (a1) comprises:
(1) pre-distorting a plurality of said waveforms; and
(2) transmitting each of said plurality of said waveforms from a different one of a plurality of transducer elements in a single transmit event.

8. The method of claim 1 wherein:
step (a1) comprises transmitting first and second ultrasonic pulses, the second ultrasonic pulse associated with a substantially opposite polarity than the first ultrasonic pulse, the first and second ultrasonic pulses pre-distorted as a function of the non-linear characteristic; and
step (b) comprises:
(b1) receiving first and second ultrasonic receive pulses, each receive pulse associated with a respective one of the transmit pulses, and each receive pulse comprising a respective fundamental receive component and a respective harmonic receive component; and
(b2) combining at least two of the receive pulses to form a composite harmonic signal.

9. The method of claim 1 wherein:
step (a1) comprises transmitting a set of ultrasonic transmit pulses into a region, each transmit pulse comprising respective first and second transmit components, the first transmit components associated with selected ones of the transmit pulses modulated at a fundamental ultrasonic frequency and being out of phase by a phase difference, the second transmit components associated with said selected ones of the transmit pulses being substantially in phase, at least one of said components pre-distorted as a function of the non-linear characteristic; and
step (b) comprises:
(b1) receiving a plurality of ultrasonic receive pulses from the region, each receive pulse associated with a respective one of the transmit pulses, and each receive pulse comprising a respective fundamental receive component and a respective harmonic receive component; and
(b2) combining at least two of the receive pulses to form a composite signal, said phase difference effective to cause the fundamental receive components to destructively interfere to a different extent than the harmonic receive components in the summing step.

10. The method of claim 9 wherein step (a1) comprises transmitting a set of unipolar ultrasonic transmit pulses.

11. The method of claim 1 wherein step (a1) comprises:
(1) generating a set of fundamental waveforms associated with a first apodization, first delays and first pulse shapes;
(2) generating a set of second harmonic waveforms associated with the first delays, a second pulse shape proportional to the first pulse shape, and a second apodization, proportional to the first apodization; and
(3) combining the set of fundamental waveforms and the second of second harmonic waveforms.

12. The method of claim 1 wherein step (a1) comprises generating a set of pre-distorted waveforms, each of said pre-distorted waveforms comprising a fundamental and a harmonic component, said set of pre-distorted waveforms associated with a different apodization for said fundamental component than for said harmonic component.

13. The method of claim 1 wherein step (a1) comprises adding a second harmonic component.

14. The method of claim 1 wherein step (a1) comprises transmitting the waveform comprising a pulse spatially defined by a first zero value adjacent to a first non-zero value of said pulse and a successive second zero value adjacent to a second non-zero value of said pulse, wherein a peak amplitude of said pulse is a first distance from said first zero value, said first distance displaced from half a distance between said first and second zero values by at least 1% of said distance between said first and second zero values.

15. The method of claim 1 wherein the step (a1) comprises attributing an amount of decrease in said peak to attenuation as a function of about 0.5 dB/cm/MHz.

16. The method of claim 1 wherein the step (a1) comprises transmitting said waveform, wherein in said peak is a first value down from a peak of said fundamental spectral component at said first region and a second value down at said second region, an absolute value of said second value greater than an absolute value of said first value by an amount that exceeds that attributable to attenuation.

17. The method of claim 16 wherein the step (a1) comprises transmitting a pre-distorted waveform comprising said peak of said harmonic spectral component suppressed by about 4 dB or more at said second region as compared to a harmonic spectral peak at said second region associated with transmission of a waveform comprising substantially only a fundamental spectral component at said first region, said first region adjacent to said transducer.

18. The method of claim 16 wherein the step (a1) comprises transmitting said waveform wherein said second region corresponds to a focal region.

19. The method of claim 18 wherein the step (a1) comprises transmitting said waveform wherein said focal region corresponds to a mechanical focal region.

20. The method of claim 18 wherein the step (a1) comprises transmitting said waveform wherein said focal region corresponds to a focal region responsive to a delay.

21. The method of claim 18 wherein the step (a1) comprises transmitting said waveform wherein said absolute value of said second value is at least 4 dB greater than absolute value of said first value in addition to said amount attributable to attenuation.

22. The method of claim 1 wherein the step (a1) comprises transmitting said waveform responsive to a sampling rate, wherein said sampling rate is 8 or greater samples per cycle of a carrier signal.

23. The method of claim 1 wherein the step (a1) comprises transmitting said waveform comprising a positive pulse temporally defined by first and second successive zero crossings and a negative pulse temporally defined by third and fourth successive zero crossings, wherein a peak amplitude of said positive pulse is a first time from said first zero crossing that is greater than half a second time between said first and second zero crossings and a peak amplitude of said negative pulse is a third time from said third zero crossing that is less than half a fourth time between said third and fourth zero crossings.

24. The method of claim 23 wherein the step (a1) comprises transmitting said waveform wherein said second and fourth times are equal.

25. The method of claim 1 wherein the step (a1) comprises transmitting said waveform wherein said peak is an equal value at a third region and said first region, wherein said third region is more distant in range from said transducer than said first and second regions.

26. The method of claim 25 wherein the step (a1) comprises transmitting said waveform wherein said peak is at a lowest level along said ultrasound line at said second region.

27. The method of claim 26 wherein the lowest level is approximately zero.

28. The method of claim 27 wherein a level of said peak corresponding to a position, z, of said waveform adjacent said second region, z=0, is given as $P(z)=\frac{1}{2}\beta\epsilon^2\omega_0\rho_0c_0z$, wherein $\beta$ is a coefficient of non-linearity, $\epsilon$ is the acoustic Mach number, $\omega_0$ is $2\pi$(center frequency), $\rho_0$ is the density and $c_0$ is the speed of sound.

29. The method of claim 1 wherein the step (a1) comprises the step (a2) of transmitting a plurality of said waveforms.

30. The method of claim 29 wherein the step (a2) comprises setting a characteristic selected from the group of: delay profile, apodization, aperture width and combinations thereof of a harmonic beam different from a fundamental beam.

31. The method of claim 1 wherein the step (a1) comprises transmitting said waveform comprising said peak corresponding to a second harmonic band.

32. In a method comprising the steps of (a) transmitting a plurality of waveforms from a transducer at a fundamental frequency and (b) receiving reflected ultrasonic energy at a harmonic of the fundamental frequency in an ultrasound system, an improvement wherein step (a) comprises the step of:
   (a1) transmitting a waveform comprising fundamental and harmonic spectral components corresponding to fundamental and harmonic temporal signal components, respectively, from a transducer, wherein a first negative sloped zero crossing associated with said harmonic signal component is less than a quarter period from a second negative sloped zero crossing associated with the fundamental signal component, said period and quarter period associated with said fundamental signal component.

33. The method of claim 32 wherein the step (a1) comprises transmitting said waveform wherein said first zero crossing is less than said quarter period after said second zero crossing.

34. The method of claim 32 wherein the step (a1) comprises transmitting said waveform wherein said first zero crossing is less than said quarter period before said second zero crossing.

35. The method of claim 32 wherein the step (a1) comprises transmitting said waveform wherein a peak of said harmonic component is at most 40 dB down from a peak of said fundamental component.

36. In a method comprising the steps of (a ) transmitting a plurality of waveforms from a transducer at a fundamental frequency and (b) receiving reflected ultrasonic energy at a harmonic of the fundamental frequency in an ultrasound system, an improvement wherein step (a) comprises the step of:
   (a1) transmitting a waveform comprising at least one positive pulse temporally beginning and ending at first and second successive zero values and at least one negative pulse temporally beginning and ending at third and fourth successive zero values, wherein a center of an amplitude distribution of said positive pulse is at a first time that is at least one percent greater than half a time between said first and zero values and a center of an amplitude distribution of said negative pulse is at a second time that is at least one percent less than half a time between said third and fourth zero values.

37. In a method comprising the steps of (a) transmitting a plurality of waveforms from a transducer at a fundamental frequency and (b) receiving reflected ultrasonic energy at a harmonic of the fundamental frequency in an ultrasound system, an improvement wherein step (a) comprises the step of:
   (a1) transmitting a waveform sampled at least 8 times a cycle from a transducer, said waveform comprising a fundamental spectral component and a harmonic spectral component, such that upon propagation, a peak of said harmonic spectral component is reduced at a second region as compared to said peak at a first region, said second region greater in range along an ultrasound line than said first region, said reduction due at least to nonlinear propagation.

38. The method of claim 37 wherein the step (a1) comprises transmitting said waveform wherein said reduction is due to at least nonlinear propagation and dissipation.

39. In a method comprising the steps of (a) transmitting a plurality of waveforms from a transducer at a fundamental frequency and (b) receiving reflected ultrasonic energy at a harmonic of the fundamental frequency in a ultrasound system, an improvement wherein step (a) comprises the step of:
   (a1) transmitting at least first and second waveforms corresponding to first and second channels, each of said first and second waveforms comprising a fundamental spectral component and a harmonic spectral component, wherein a characteristic of said harmonic spectral component as compared to said fundamental component is different for said first channel than said second channel.

40. The method of claim 39 wherein the step (a1) comprises the step of setting said characteristic selected from the group of: delays, phases, center frequencies, bandwidths, amplitudes and combinations thereof.

41. The method of claim 39 wherein the characteristic referred to in step (a1) is the relative amplitude of the harmonic component as compared to the fundamental component.

42. The method of claim 39 wherein the characteristic referred to in step (a1) is the relative phase of the harmonic component as compared to the fundamental component.

43. The method of claim 39 wherein the characteristic referred to in step (a1) is the relative delay of the harmonic component as compared to the fundamental component.

44. The method of claim 39 wherein the characteristic referred to in step (a1) is the relative center frequency of the harmonic component as compared to the fundamental component.

45. The method of claim 39 wherein the characteristic referred to in step (a1) is the relative bandwidth of the harmonic component as compared to the fundamental component.

46. The method of claim 39 wherein the step (a1) comprises transmitting a plurality of waveforms corresponding to a plurality of channels, wherein an apodization associated with a harmonic beam is different than an apodization associated with a fundamental beam.

47. The method of claim 39 wherein the step (a1) comprises transmitting a plurality of waveforms corresponding to a plurality of channels, wherein a delay profile associated with a harmonic beam is different than a delay profile associated with a fundamental beam.

48. The method of claim 39 wherein the step (a1) comprises transmitting a plurality of waveforms corresponding to a plurality of channels, wherein an aperture width associated with a harmonic beam is different than an aperture width associated with a fundamental beam.

* * * * *